(12) United States Patent
Martin et al.

(10) Patent No.: US 12,225,982 B2
(45) Date of Patent: Feb. 18, 2025

(54) SHIFT REEL AND RELATED METHODS

(71) Applicant: Shift Holding, LLC, Steamboat Springs, CO (US)

(72) Inventors: John Martin, Vashon, WA (US); Brian Fletcher, Cashmere, WA (US); Aaron Ambuske, Seattle, WA (US); Zachary West, Seattle, WA (US); Jay Barrett Willet, Tacoma, WA (US); Ana Mirona Motoc, Seattle, WA (US); Dan Herbert, Seattle, WA (US); Hedvig Von Beetzen, Seattle, WA (US); Joseph Mahon, Salt Lake City, UT (US); Jimmy Capra, Steamboat Springs, CO (US); Matthew Sinclair, Steamboat Springs, CO (US)

(73) Assignee: Shift Holding, LLC, Steamboat Springs, CO (US)

(*) Notice: Subject to any disclaimer, the term of this patent is extended or adjusted under 35 U.S.C. 154(b) by 0 days.

(21) Appl. No.: 18/343,641

(22) Filed: Jun. 28, 2023

(65) Prior Publication Data
US 2024/0000195 A1 Jan. 4, 2024

Related U.S. Application Data

(63) Continuation of application No. 17/175,281, filed on Feb. 12, 2021, now Pat. No. 11,730,238.
(Continued)

(51) Int. Cl.
*A43C 11/16* (2006.01)
*F16H 3/70* (2006.01)

(52) U.S. Cl.
CPC .............. *A43C 11/165* (2013.01); *F16H 3/70* (2013.01)

(58) Field of Classification Search
CPC ....... A43C 11/165; A43C 11/008; A43C 7/00; F16H 3/70
See application file for complete search history.

(56) References Cited

U.S. PATENT DOCUMENTS

| 3,675,502 A | 7/1972 | Sarah |
| 4,660,300 A | 4/1987 | Morell et al. |
| (Continued) | | |

FOREIGN PATENT DOCUMENTS

| CN | 105433512 | 3/2016 |
| CN | 2019301862907 | 10/2019 |
| (Continued) | | |

OTHER PUBLICATIONS

Click Medical (1), posted Nov. 20, 2021[online], [retrieved Jan. 3, 2023]. https://www.facebook.com/clickmedical/photos/pb.100063715383743.-2207520000./5192740494076575/?type=3 (Date: 2022) (Year: 2021).

(Continued)

*Primary Examiner* — Robert Sandy
*Assistant Examiner* — Rowland Do
(74) *Attorney, Agent, or Firm* — Dorsey & Whitney LLP

(57) ABSTRACT

Reel devices, systems, and related methods are disclosed. The reel devices are modular and include an automatic shift assembly that shifts to provide a mechanical advantage when used to tighten a cord. For instance, the reel devices are configured to provide a first drive ratio and automatically transition to a second drive ratio in response to a torque force. The reel devices include a drive assembly and a shift assembly. The drive assembly includes a cycloidal gear.

20 Claims, 15 Drawing Sheets

Related U.S. Application Data

(60) Provisional application No. 62/977,031, filed on Feb. 14, 2020.

(56) References Cited

U.S. PATENT DOCUMENTS

| | | | |
|---|---|---|---|
| 5,600,874 A | 2/1997 | Jungkind |
| 6,256,798 B1 | 7/2001 | Egolf et al. |
| 6,997,409 B1 | 2/2006 | Bledsoe et al. |
| 7,591,050 B2 | 9/2009 | Hammerslag |
| 7,954,204 B2 | 6/2011 | Hammerslag et al. |
| 8,468,657 B2 | 6/2013 | Soderberg et al. |
| 8,516,662 B2 | 8/2013 | Goodman et al. |
| 8,695,912 B2 | 4/2014 | Tracey et al. |
| 8,939,925 B2 | 1/2015 | Ingimundarson et al. |
| D758,061 S | 6/2016 | Whewell |
| 9,365,387 B2 | 6/2016 | Beers et al. |
| 9,375,053 B2 | 6/2016 | Burns et al. |
| 9,408,437 B2 | 8/2016 | Goodman et al. |
| 9,532,893 B2 | 1/2017 | Beers et al. |
| 9,610,185 B2 | 4/2017 | Capra et al. |
| 9,629,417 B2 | 4/2017 | Cavanagh et al. |
| 9,681,705 B2 | 6/2017 | Trudel et al. |
| 9,737,115 B2 | 8/2017 | Soderberg et al. |
| 9,770,070 B2 | 9/2017 | Cotterman et al. |
| 9,867,430 B2 | 1/2018 | Hammerslag et al. |
| 9,872,790 B2 | 1/2018 | Capra et al. |
| 10,004,297 B2 | 6/2018 | Lovett |
| 10,004,614 B1 | 6/2018 | Johnson |
| 10,076,160 B2 | 9/2018 | Burns et al. |
| 10,251,451 B2 | 4/2019 | Converse et al. |
| 10,368,607 B2 | 8/2019 | Dyer et al. |
| 10,405,609 B2 | 9/2019 | Orand |
| 10,406,003 B2 | 9/2019 | Johnson |
| 10,772,388 B2 | 9/2020 | Burns et al. |
| D897,661 S | 10/2020 | Nickel |
| 10,849,390 B2 | 12/2020 | Hammerslag et al. |
| 10,952,503 B2 | 3/2021 | Trudel et al. |
| D918,006 S | 5/2021 | Hanks |
| 11,122,865 B2 | 9/2021 | Burt et al. |
| 11,220,030 B2 | 1/2022 | Hipwood et al. |
| 11,297,903 B2 | 4/2022 | Soderberg et al. |
| 11,344,086 B2 | 5/2022 | Fiedler et al. |
| 11,452,342 B2 | 9/2022 | Hammerslag et al. |
| 11,457,698 B2 | 10/2022 | Burns et al. |
| 11,492,228 B2 | 11/2022 | Kruse et al. |
| 11,633,020 B2 | 4/2023 | Burns et al. |
| 11,717,056 B2 | 8/2023 | Converse et al. |
| 11,737,519 B2 | 8/2023 | Soderberg et al. |
| 11,806,264 B2 | 11/2023 | Miller et al. |
| 11,844,404 B2 | 12/2023 | Burns et al. |
| 11,844,667 B2 | 12/2023 | Johnson |
| 2009/0172928 A1 | 7/2009 | Messmer et al. |
| 2010/0139057 A1 | 6/2010 | Soderberg et al. |
| 2010/0274364 A1 | 10/2010 | Pacanowsky et al. |
| 2013/0277485 A1 | 10/2013 | Soderberg et al. |
| 2014/0068838 A1 | 3/2014 | Beers et al. |
| 2014/0070042 A1 | 3/2014 | Beers et al. |
| 2014/0221889 A1 | 8/2014 | Burns et al. |
| 2015/0076272 A1 | 3/2015 | Trudel et al. |
| 2015/0313319 A1 | 11/2015 | Ha |
| 2016/0009523 A1 | 1/2016 | Omarsson et al. |
| 2016/0206047 A1 | 7/2016 | Hammerslag et al. |
| 2016/0354223 A1 | 12/2016 | Burns et al. |
| 2018/0035759 A1 | 2/2018 | Pollack et al. |
| 2018/0125168 A1 | 5/2018 | Beers et al. |
| 2018/0168259 A1 | 6/2018 | Kim |
| 2019/0150569 A1 | 5/2019 | Chen |
| 2019/0343235 A1 | 11/2019 | So |
| 2020/0087104 A1 | 3/2020 | Wang |
| 2020/0128919 A1 | 4/2020 | Burt et al. |
| 2020/0268108 A1 | 8/2020 | Fiedler |
| 2020/0282542 A1 | 9/2020 | Petursson et al. |
| 2021/0177098 A1 | 6/2021 | Trudel et al. |
| 2021/0186160 A1 | 6/2021 | Chen |
| 2021/0251343 A1 | 8/2021 | Martin et al. |
| 2021/0401121 A1 | 12/2021 | Kim |
| 2022/0175089 A1 | 6/2022 | Pollack et al. |
| 2022/0259003 A1 | 8/2022 | Ha et al. |
| 2022/0330660 A1 | 10/2022 | Burt et al. |
| 2023/0248116 A1 | 8/2023 | Duller et al. |
| 2024/0065870 A1 | 2/2024 | Miller et al. |
| 2024/0138529 A1 | 5/2024 | Burns et al. |

FOREIGN PATENT DOCUMENTS

| | | |
|---|---|---|
| CN | 2019303284704 | 12/2019 |
| KR | 3020220006666 | 11/2022 |
| WO | 2018169174 | 9/2018 |
| WO | 2021163578 | 8/2021 |

OTHER PUBLICATIONS

Click Medical, posted Oct. 11, 2021 [online], [retrieved Jan. 3, 2023]. Retrieved from internet, https://www.facebook.com/photo/?fbid=5032163816800911&set=pb.100063715383743.-2207520000 (Date:2022) (Year: 2021).

Click Reel with Shift Technology, posted Mar. 3, 2021 [online], [retrieved Jan. 4, 2023]. Retrieved from internet, https://vimeo.com/519271127 (Date:2022) (Year: 2021).

International Search Report and Written Opinion dated Jun. 21, 2021 for international application PCT/US2021/017978.

Non-Final Office Action dated Dec. 19, 2022 received in U.S. Appl. No. 17/175,281.

Non-Final Office Action dated Jan. 19, 2023 issued in U.S. design U.S. Appl. No. 29/775,650.

Summer , "10 things you need to know about Boa Technology", Sep. 3, 2015, roadbikereview.com, https://www.roadbikereview.com/reviews/10-things-you-need-to-know-about-boa-technology.

Notice of Allowance dated Sep. 21, 2023 issued in U.S. Appl. No. 29/775,650.

European Search Report dated Feb. 14, 2024 issued in European patent application No. 21754517.7.

SHIFT REEL AND RELATED METHODS

RELATED APPLICATIONS

This application is a continuation of U.S. application Ser. No. 17/175,281, filed Feb. 12, 2021, and titled "SHIFT REEL AND RELATED METHODS," which claims priority to U.S. Provisional Application No. 62/977,031, filed Feb. 14, 2020, and titled "SHIFT REEL AND RELATED METHODS," each of which is incorporated herein by reference in its entirety.

TECHNICAL FIELD

The present disclosure relates to reel devices and related systems and methods. More specifically, the present disclosure relates to reel devices having an automatic shift assembly that can shift to provide a mechanical advantage while tightening a cord to adjust another device.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
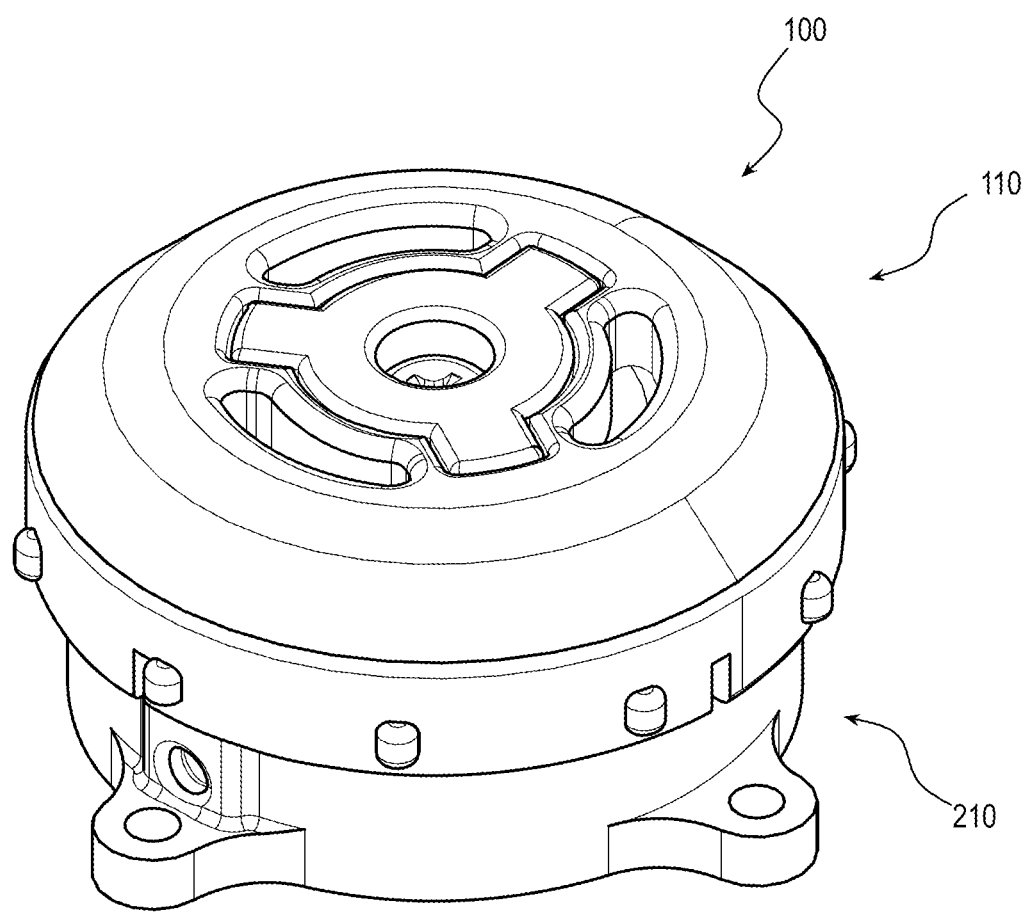
FIG. 1 is a perspective view of an embodiment of a reel device.

The present disclosure relates to reel devices and related systems and methods. The reel devices can include an automatic shift assembly that can shift to provide a mechanical advantage when used to tighten a cord. The reel devices can be used in various applications, such as with prosthetic devices. For instance, a prosthetic device can include a cord configured to be tightened to provide a better fit of a prosthesis socket to a user's residuum. Use of the reel devices to tighten cords and/or straps on other types of equipment (e.g., outdoor or sports equipment) is also contemplated. Tightening of the cord may be accomplished using a reel device disclosed herein that can shift to provide a mechanical advantage such that the cord can be easily, quickly, and adequately tightened by hand or by a motor.

The reel device may include a drive assembly and a shift assembly. In one embodiment, the drive assembly may include a drive axle to rotate one or more components, such as a gear assembly and/or a spool. The drive assembly can also include a clutch to limit the maximum amount of tension that can be applied by the reel device. The shift assembly can be automatic. The shift assembly may include one or more of a base, a shift member, or a torque control member. The drive assembly (or components thereof) and the shift assembly (or components thereof) may be modular such that a first drive assembly (or components thereof) having a first drive ratio may be replaced by a second drive assembly (or components thereof) having a second drive ratio, etc.

In another embodiment, the drive assembly may include one or more of a drive axle to rotate one or more components, such as a rotational engagement member, a release disk, a lower cap, a pin gear, a cycloidal gear, an outer gear, and a spool. The drive axle may engage with an upper cap to rotate the drive axle. The rotational engagement member, release disk, lower cap, pin gear, cycloidal gear, and outer gear may be disposed within a cavity of the upper cap. The shift assembly may include one or more of a base, a shift member, or a torque control member. In some of such embodiments, the drive assembly and the shift assembly may be modular such that a first drive assembly having a first drive ratio may be replaced by a second drive assembly having a second drive ratio, etc.

In another embodiment, the drive assembly may include a drive axle to rotate one or more components, such as a lower cap, a pin gear, a cycloidal gear, an outer gear, or a spool. The drive axle may engage with an upper cap to rotate the drive axle. The drive assembly can also include a clutch to limit the maximum amount of tension that can be applied by the reel device. The shift assembly may include one or more of a base, a shift member, or a torque control member. The drive assembly (or components thereof) and the shift assembly (or components thereof) may be modular such that a first drive assembly (or components thereof) having a first drive ratio may be replaced by a second drive assembly (or components thereof) having a second drive ratio, etc.

As detailed below, the reel device is configured to automatically provide a mechanical advantage when tightening the cord of a device. For example, in a pre-shifted (or non-shifted) configuration, the upper cap of the reel device may be rotated such that the spool that uptakes the cord is rotated in a 1:1 ratio (or an approximately 1:1 ratio that is less than about 2:1 or less than about 1.5:1). In other words, for every full turn of the upper cap, the spool is also rotated approximately one full turn. This configuration facilitates a quick uptake of slack of the cord as the upper cap is rotated. As a tension force on the cord increases, the cord can exert a torque force on the shift member, rotating the shift member towards a shifted position. When a threshold tension and/or torque force is exceeded and the shift member has rotated to the shifted position, the reel device changes from the pre or non-shifted configuration having 1:1 drive ratio (or an approximately 1:1 drive ratio) to a shifted configuration having a different drive ratio that provides a mechanical advantage for continued tightening of the cord. This mechanical advantage can decrease the amount of rotational force that is required from the user to continue tightening the cord as the spool is no longer rotated with the upper cap in a 1:1 ratio (or an approximately 1:1 drive ratio). If the tension force on the cord is later decreased below the threshold tension, the reel device can automatically change from the shifted configuration back to the pre or non-shifted configuration having a 1:1 drive ratio (or an approximately 1:1 drive ratio). Configuring the reel device in this manner is advantageous in many ways. For instance, devices that are geared with a constant 1:1 drive ratio (or an approximately 1:1 drive ratio) can be difficult to tighten as the tension on the cord increases, requiring significant amounts of rotational force to be applied by the user. And devices that are geared with a constant mechanical advantage are also disadvantageous, as the speed of adjustment is adversely impacted due to the number of turns that may be required to wind up the cord (especially when there is slack in the cord). The reel devices disclosed herein address these and many other issues, as further discussed below.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Figure 11:
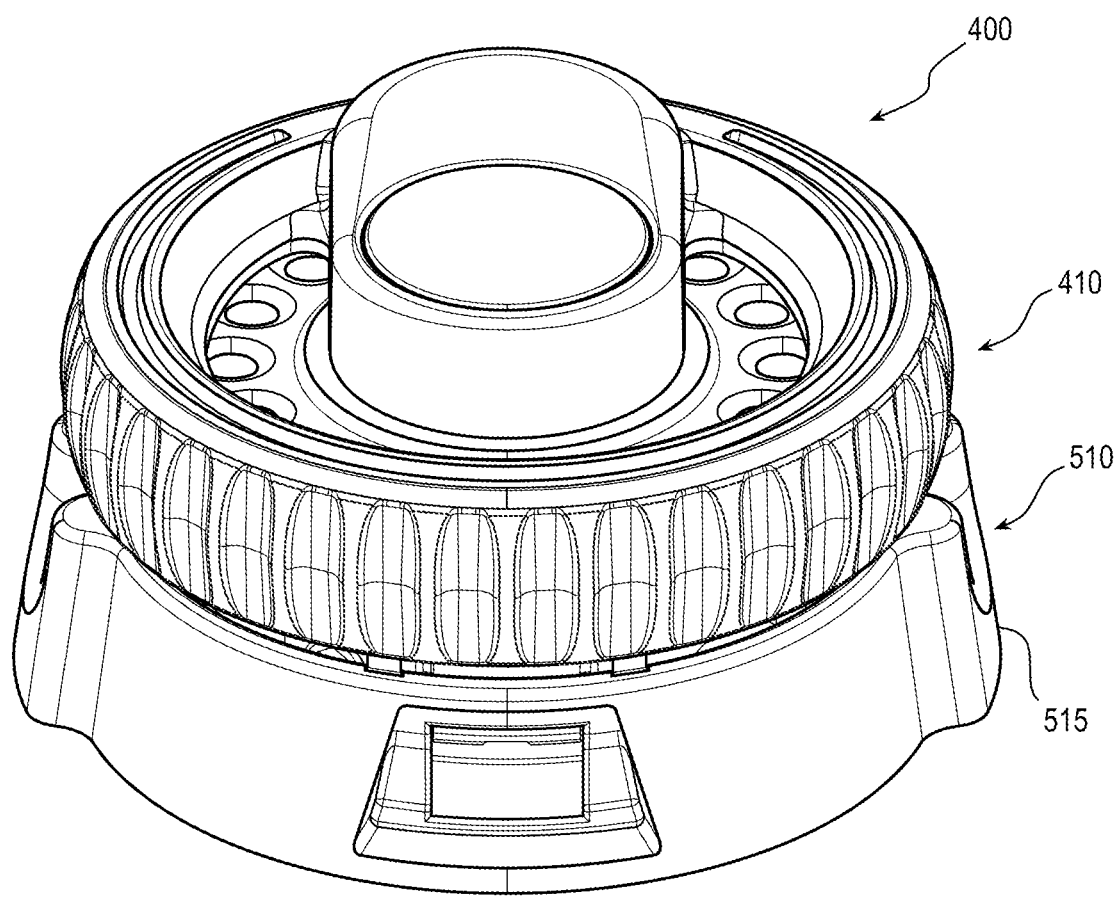
FIG. 11 is a perspective view of another embodiment of a reel device.
Figure 12:
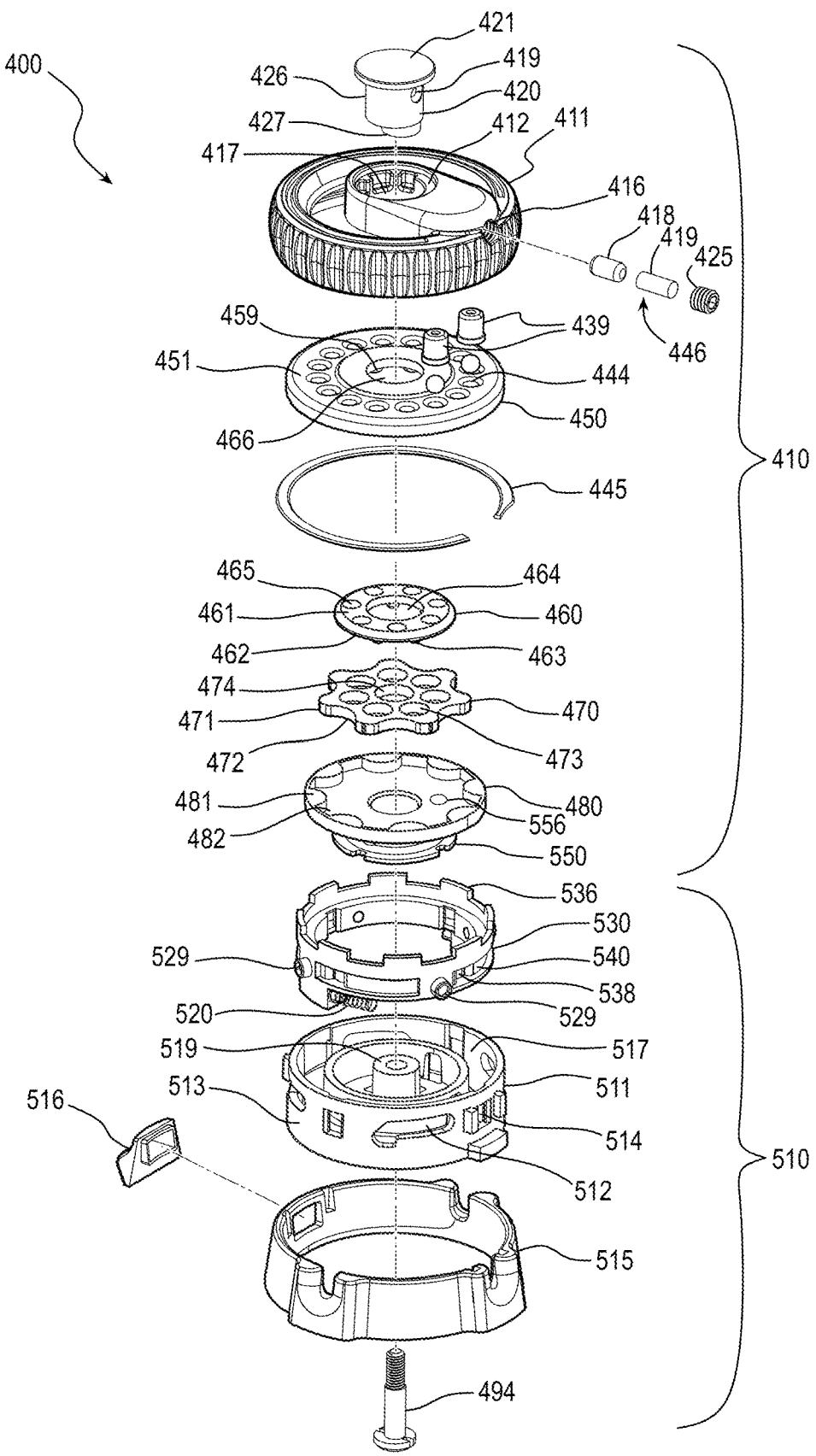
FIG. 12 is an exploded view of the reel device of FIG. 11.
Figure 13:
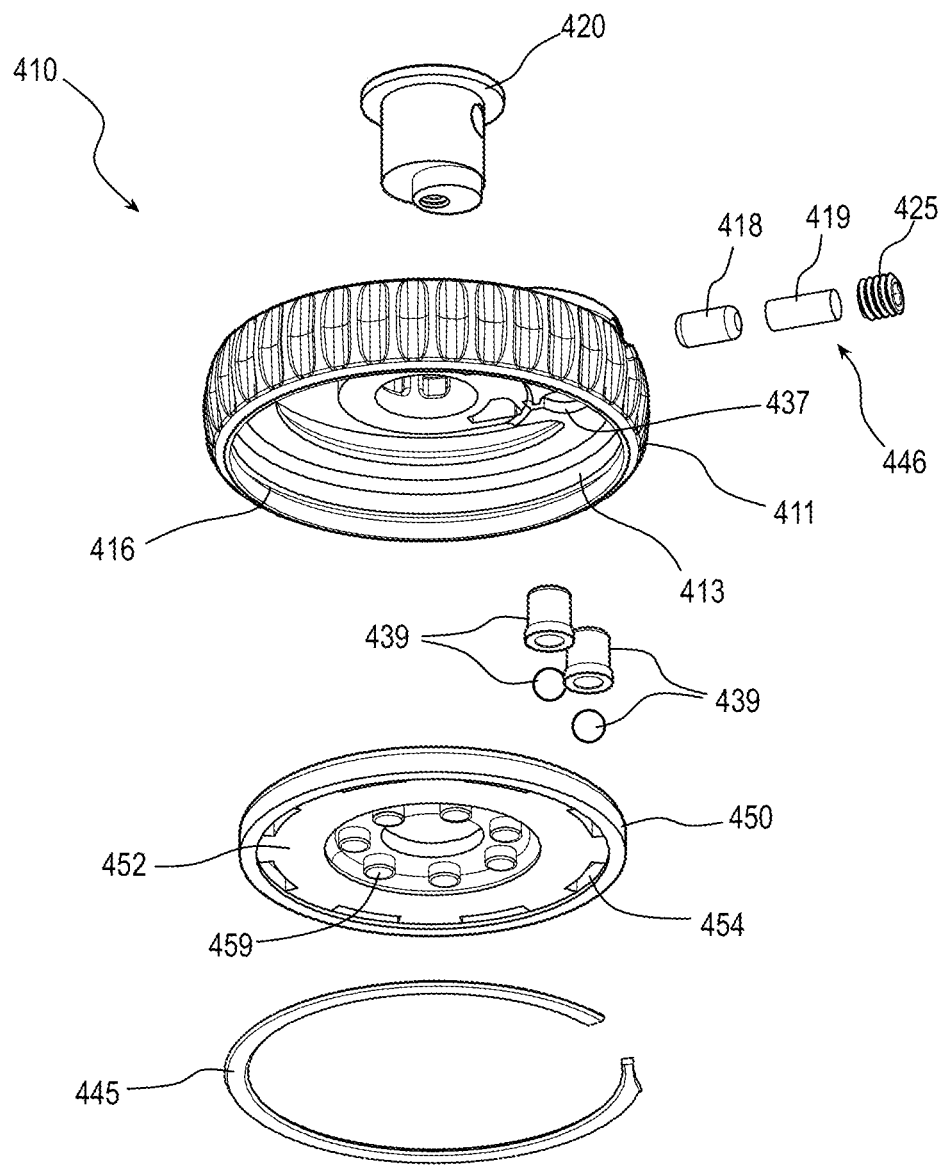
FIG. 13 is a bottom perspective view of a portion of the reel device of FIG. 11.

FIGS. 1-10 illustrate different views of an embodiment of a reel device and related components. FIGS. 11-13 illustrate another embodiment of a reel device and related components. In certain views, the reel devices may be coupled to, or shown with, additional components not included in every view. Further, in some views, only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

Figure 2:
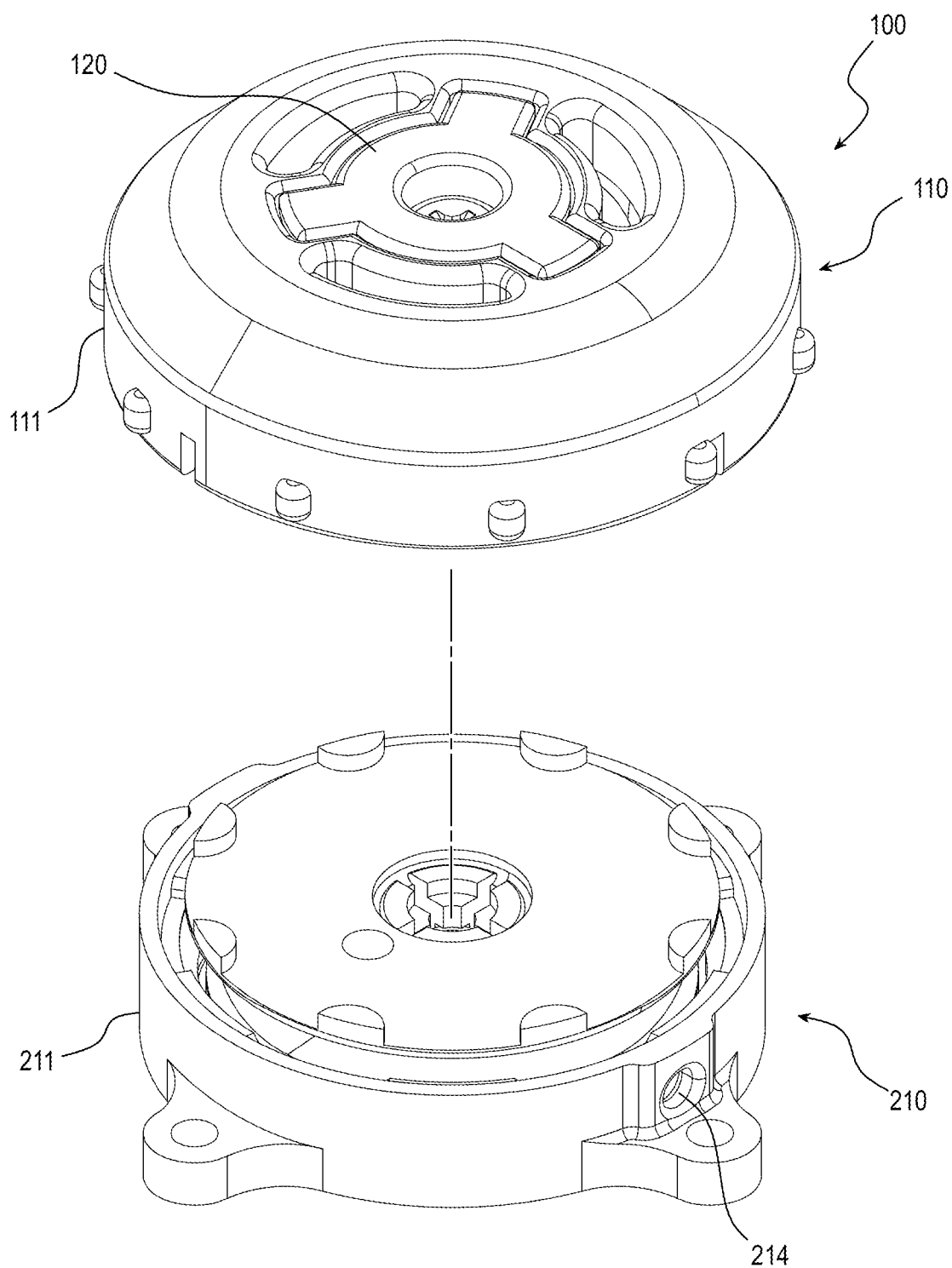
FIG. 2 is a perspective view of the reel device of FIG. 1 showing the upper cap separated from the base.
Figure 3:
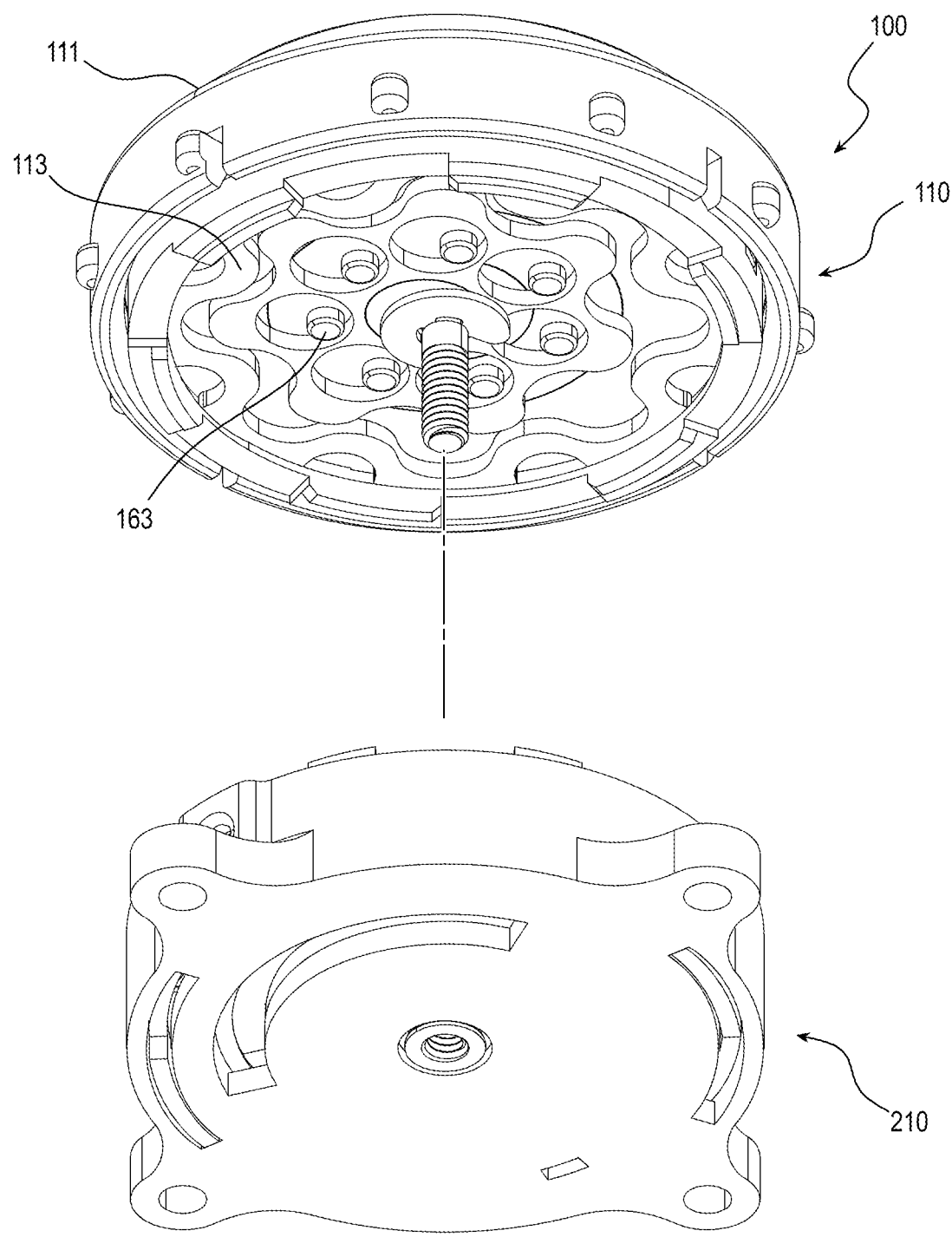
FIG. 3 is another perspective view of the reel device of FIG. 1 showing the upper cap separated from the base

FIGS. 1-10 depict an embodiment of a reel device 100. As shown therein, the reel device 100 is generally comprised of a drive assembly 110 and a shift assembly 210. As illustrated in FIGS. 2 and 3, and the exploded view of the reel device 100 of FIG. 4, the drive assembly 110 may include one or more of an upper cap or upper member 111, a drive axle 120, a rotational engagement member 130 (e.g., such as a trispring), a release disk 140, a lower cap or lower member 150, a pin gear 160, a cycloidal gear 170, an outer gear 180, and a spool 250; and the shift assembly 210 may comprise one or more of a base 211, a torque control member 220 (such as a spring), and a shift member 230. The drive assembly 110 and/or the shift assembly 210 may be provided to a user in various configurations to accommodate a variety of uses. For example, the drive assembly 110 may be provided with any variety of selected drive mechanisms that facilitate different mechanical advantage ratios and/or the drive assembly 110 may be provided with a variety of different spool capacities to accommodate different cord lengths and/or sizes, etc. The drive assembly 110 and/or shift assembly 210 may be interchangeable with a differently configured drive assembly and/or shift assembly using any suitable tool-based or tool-less technique.

The upper cap 111 is generally domed shaped. The upper cap 111 can include a recess 112 disposed in an upper surface. The recess 112 can be shaped to receive a head 121 of the drive axle 120. In the depicted embodiment, the recess 112 includes a central portion and three radial outwardly extending portions. In another embodiment, the recess 112 may include a single radial outwardly extending portion or another suitable configuration that mates with or is keyed to receive a head 121 of a drive axle 120. The recess 112 can facilitate rotation of the drive axle 120 when the upper cap 111 is rotated. In some embodiments, the upper cap 111 may be optically clear or substantially transparent to facilitate visualization of the drive assembly 110 (e.g., to determine a status of the drive assembly 110). In other embodiments, the upper cap 111 includes a transparent portion to facilitate visual observation of the drive assembly 110 (e.g., to determine the status of the drive assembly 110).

The upper cap 111 includes a cavity 113 for selective disposition of one or more components of the drive assembly 110. The cavity 113 can include a plurality of teeth 114 disposed around a circumference of the cavity 113 (shown in FIG. 5B). The teeth 114 can be configured to engage with detents 133 of a rotational engagement member 130. The teeth 114 may be of any suitable form. For example, the teeth 114 may include a plurality of rounded protrusions with a plurality of rounded recesses disposed between the protrusions. In another embodiment, the teeth 114 may be angled.

Figure 4:
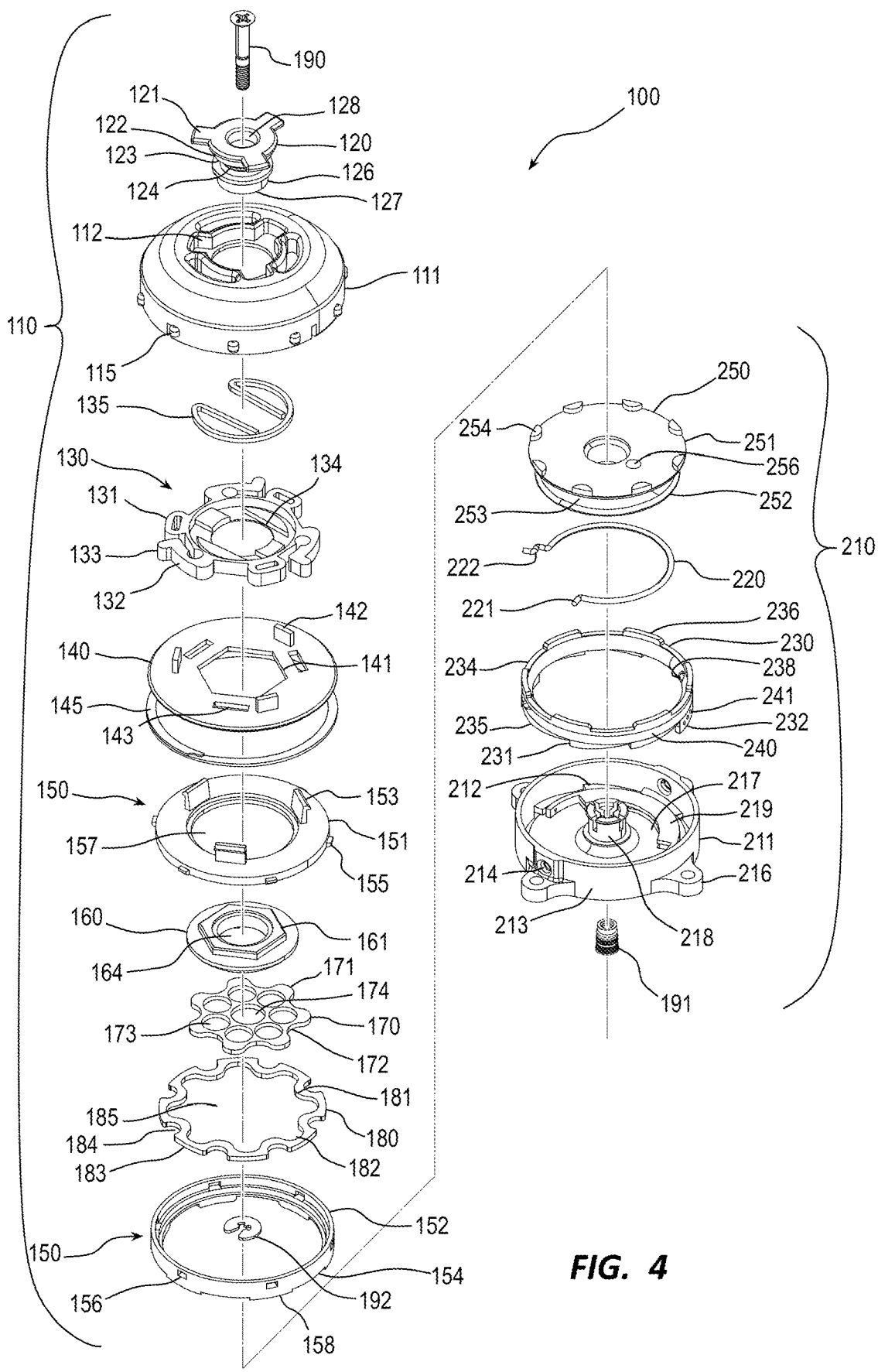
FIG. 4 is a perspective exploded view of the reel device of FIG. 1.
Figure 9A:
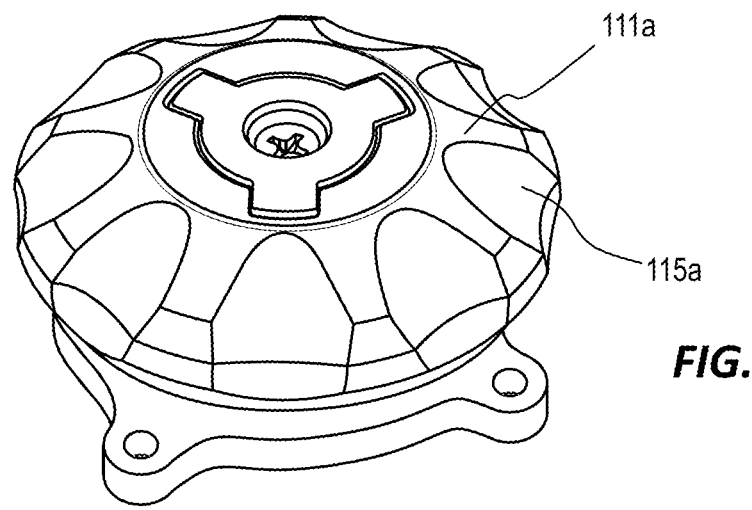
FIG. 9A is a perspective view of an alternative upper cap of the reel device of FIG. 1 having finger depressions.
Figure 9B:
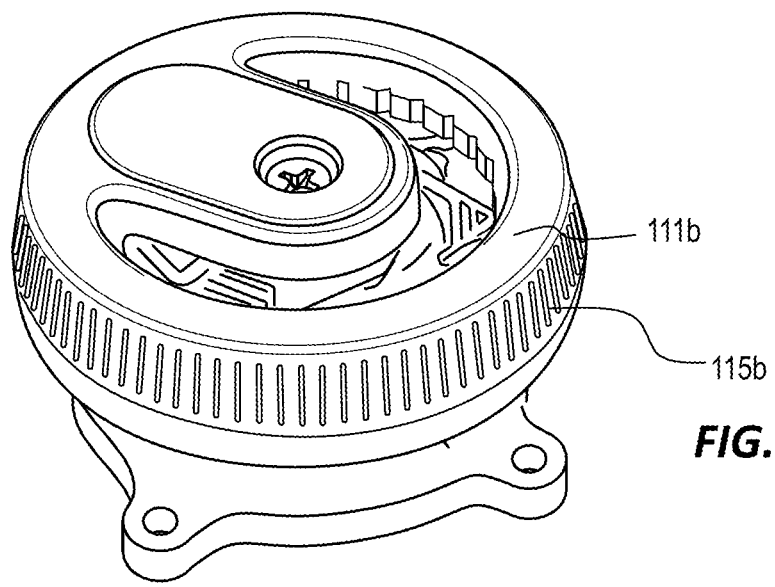
FIG. 9B is a perspective view of another alternative upper cap of the reel device of FIG. 1 having knurls.
Figure 9C:
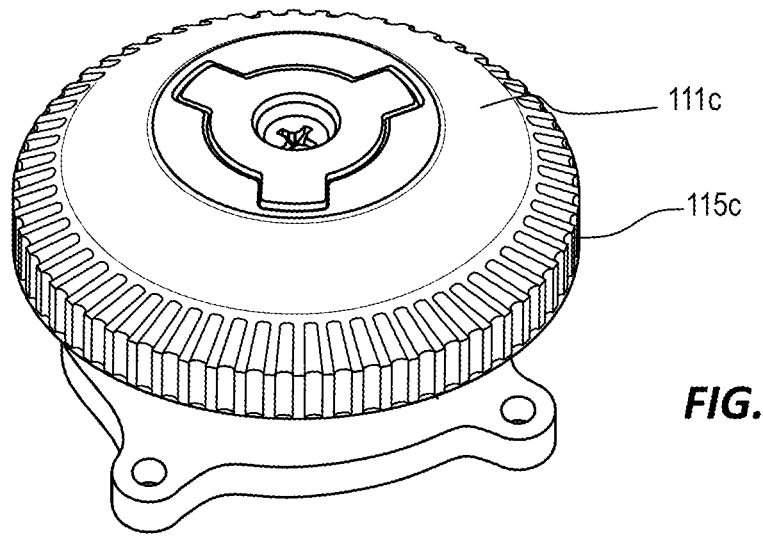
FIG. 9C is a perspective view of another alternative upper cap of the reel device of FIG. 1 having knurls.

The upper cap 111 may also include a grip enhancing feature 115. The grip enhancing feature 115 may be a plurality of nubs disposed around an outer circumference of the upper cap 111, as shown in FIG. 4. Alternatively, the grip enhancing feature 115 may be a plurality of finger depressions and ridges 115a disposed around the perimeter of an upper cap 111a, as depicted in FIG. 9A, or a plurality of knurls 115b, 115c disposed around the perimeter of upper caps 111b, 111c, as depicted in FIGS. 9B and 9C. Other configurations of the grip enhancing feature 115 are also contemplated and are within the scope of this disclosure. An over cap member (not depicted) can also be disposed over and/or coupled to the upper cap 111 as desired. For instance, a relatively large over cap can be disposed over and/or coupled to the upper cap 111 for increasing dexterity and/or leverage for patients with lower hand strength and/or grip.

The over cap can be various sizes and/or shapes as desired. If desired, the over cap can also include a motor assembly included therein to control and/or adjust rotation of the upper cap 111. Including a motor assembly in the over cap can be advantageous in converting a non-motorized device to a motorized device.

Figure 5A:
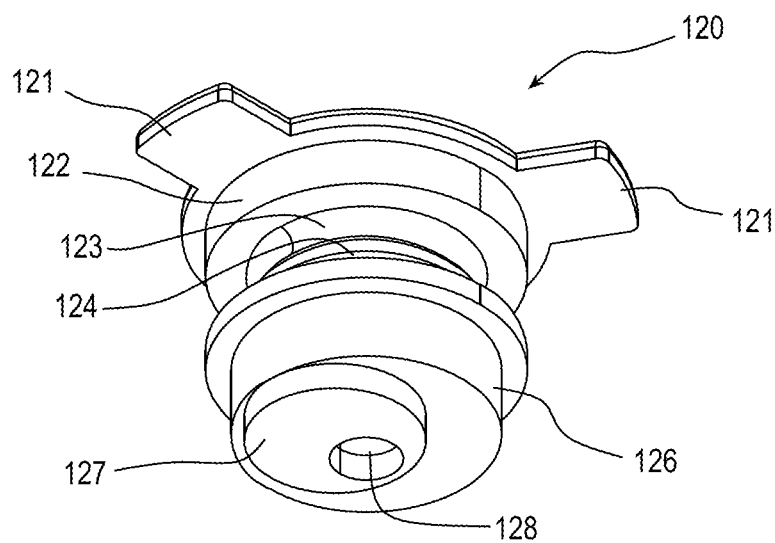
FIG. 5A is a perspective view of a drive axle of the reel device of FIG. 1
Figure 5B:
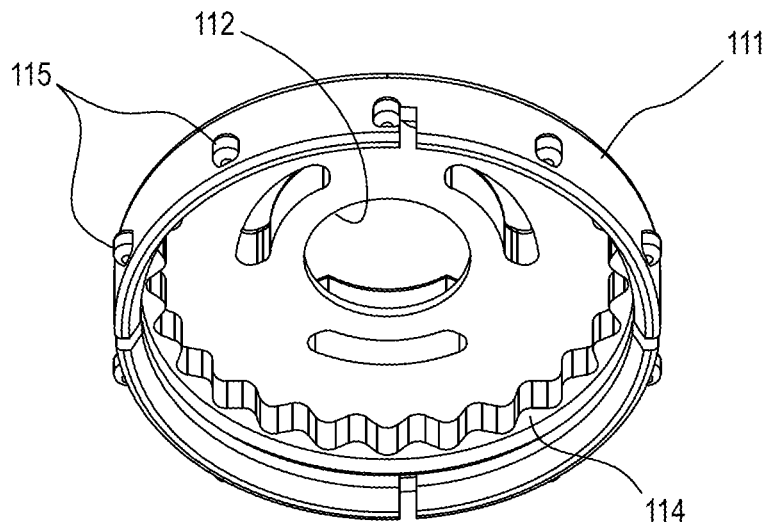
FIG. 5B is a bottom perspective view of an upper cap of the reel device of FIG. 1.

The drive axle 120 is shown in FIGS. 4 and 5A to include the head 121, an upper shaft portion 122, a centric shaft portion 126, an eccentric shaft portion 127, and a bore 128. As discussed previously, the head 121 is configured to be moveably disposed within the recess 112 of the upper cap 111. The depicted drive axle 120 includes a head 121 having a central portion and three radial outwardly extending arms. In other embodiments, the head 121 can include a single radial outwardly extending arm or another suitable configuration that mates with or is keyed to be disposed in the recess 112 of the upper cap 111. The upper shaft portion 122 extends downwardly from the head 121 and includes an upper groove 123 and a lower groove 124. The grooves 123, 124 may be engaged by a retention clip 135 of the rotational engagement member 130.

The centric shaft portion 126 extends downwardly from the upper shaft portion 122. The centric shaft portion 126 may have a diameter larger than the upper shaft portion 122 and the eccentric shaft portion 127. The centric shaft portion 126 can extend through and rotate within the pin gear 160. The eccentric shaft portion 127 extends downwardly from the centric shaft portion 126. A central vertical axis of the eccentric shaft portion 127 is radially offset from a longitudinal axis of the drive axle 120. The eccentric shaft portion 127 can be configured to be rotationally coupled to the cycloidal gear 170. A screw 190 may coaxially extend through the bore 128 of the drive axle 120 and the drive axle 120 may rotate around the screw 190.

With continued reference to FIG. 4, the rotational engagement member 130 includes a rotational engagement housing 131 and a retention clip 135. The rotational engagement housing 131 is shown to include three spring arms 132 (e.g., a tri-spring). In other embodiments the rotational engagement housing 131 may include any suitable number of spring arms 132. For example, the rotational engagement housing 131 can include one, two, four, five, or more spring arms 132. Each of the spring arms 132 includes a detent 133 disposed at a free end of the spring arm 132. The detents 133 may be configured to engage the teeth 114 of the upper cap 111 to rotate the rotational engagement member 130 as the upper cap 111 is rotated when the reel device 100 is in a pre-shifted configuration. The detents 133 may also be configured to releasably engage the teeth 114 of the upper cap 111 when the rotational engagement member 130 is prevented from rotating in a shifted configuration.

A retention clip 135 can be disposed within a groove 134 of the rotational engagement housing 131. The retention clip 135 can be generally C-shaped with two parallel bars. The retention clip 135 can be configured to engage the upper groove 123 and the lower groove 124 of the drive axle 120. For example, the retention clip 135 can be engaged with the lower groove 124 when the reel device 100 is in a pre or non-shifted and shifted configuration during uptake of the cord 193 (not shown). The retention clip 135 can be transitioned to engage with the upper groove 123 when the reel device 100 is in a released configuration to rapidly release tension on the cord 193 and allow the cord 193 to be unwound from the spool 250. In some embodiments, the retention clip 135 can include flexible arms configured to engage the teeth 114 of the upper cap 111.

The release disk 140 can be disposed adjacent the rotational engagement member 130. As depicted, the release disk 140 includes a locking passage 141 disposed centrally through the release disk 140. The locking passage 141 can be configured to couple with the pin gear 160 to rotate the pin gear 160 when the release disk 140 is rotated. As illustrated the locking passage 141 has a hexagonal shape. In other embodiments, the locking passage 141 may have any suitable shape that couples with the pin gear 160, such as triangular, square, rectangular, pentagonal, etc. Retention clips 142 may extend upwardly from an upper surface of the release disk 140. The retention clips 142 may fixedly couple the release disk 140 to the rotational engagement member 130.

Figure 8A:
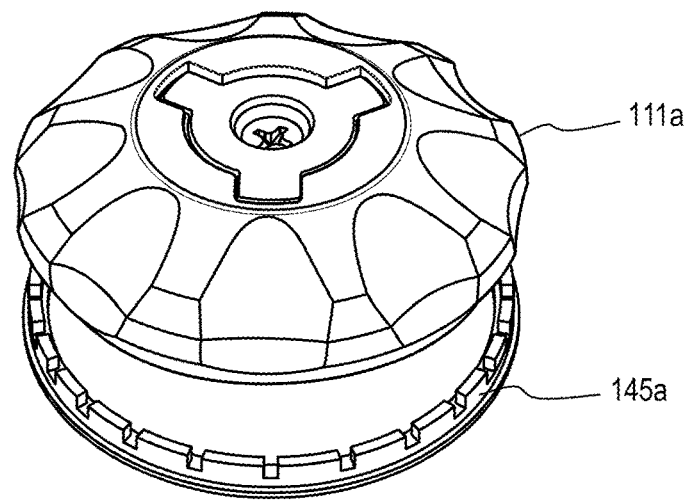
FIG. 8A is a perspective view of the upper cap of the reel device of FIG. 1 having a snap ring.
Figure 8B:
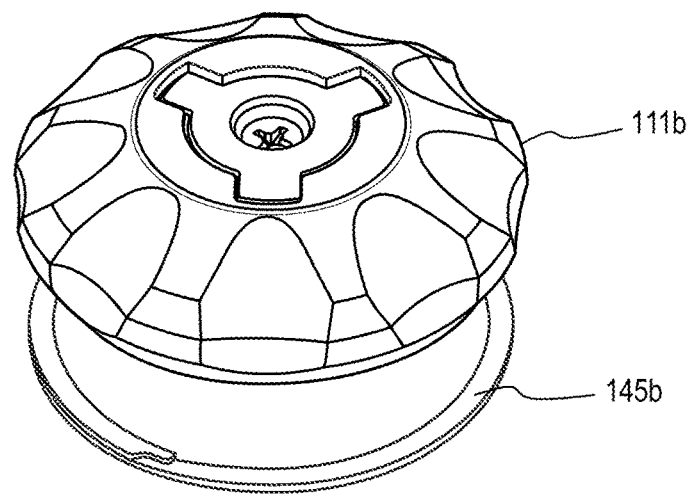
FIG. 8B is a perspective view of the upper cap of the reel device of FIG. 1 having a threaded ring.
Figure 8C:
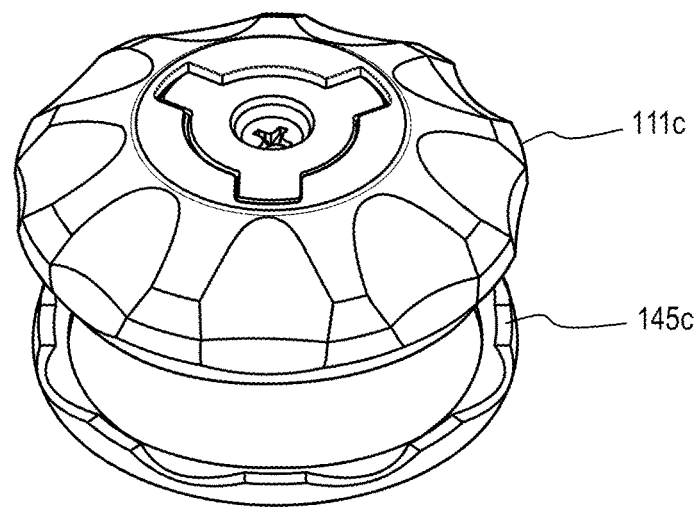
FIG. 8C is a perspective view of the upper cap of the reel device of FIG. 1 having a retainer ring.

In some embodiments, the release disk 140 can be retained within the cavity 113 of the upper cap 111 by a release disk ring 145 coupled to the upper cap 111 such that when the upper cap 111 is displaced longitudinally upward, the release disk 140 is also displaced longitudinally upward. In some embodiments, the release disk ring 145 may be a snap release disk ring 145a configured to snap into the upper cap 111a as depicted in FIG. 8A. In other embodiments, the retainer release disk ring 145b is configured to couple to the upper cap 111b as depicted in FIG. 8B, or the release disk ring 145c is configured to threadingly couple to the upper cap 111c as depicted in FIG. 8C. Other configurations of the release disk ring 145 are also contemplated and are within the scope of this disclosure.

Figure 5C:
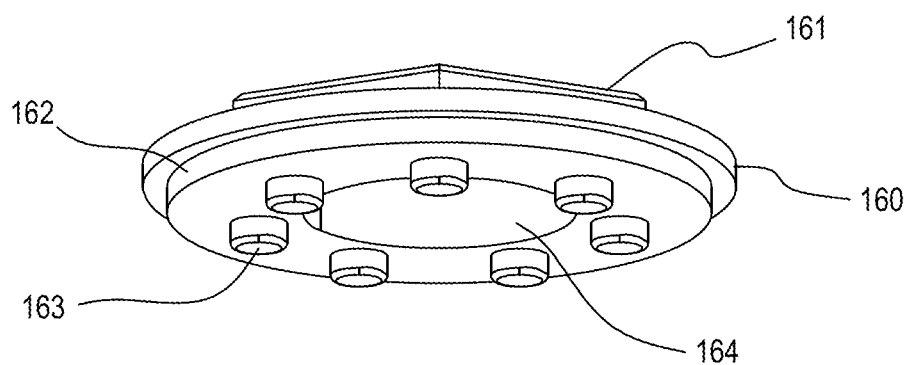
FIG. 5C is a bottom perspective view of a pin gear of the reel device of FIG. 1.

The pin gear 160 is disposed adjacent the release disk 140. As illustrated in FIG. 4, the pin gear 160 includes an upper locking portion 161 and a lower portion 162. The upper locking portion 161 is shaped to be lockingly received by the locking passage 141 of the release disk 140. In other words, the shape of the upper locking portion 161 can be the same shape as the locking passage 141. In FIG. 5C, a plurality of pins 163 are shown to extend downwardly from the lower portion 162. The pins 163 are disposed in a circular pattern adjacent a perimeter of the lower portion 162. The number of pins 163 may be equivalent to the number of lobes 171 of the cycloidal gear 170. A central passage 164 is disposed through the upper locking portion 161 and the lower portion 162. The central passage 164 is sized to accommodate the centric shaft portion 126 of the drive axle 120 such that drive axle 120 can be rotated relative to the pin gear 160.

As illustrated in FIG. 4, the cycloidal or wobble gear 170 is disposed adjacent the pin gear 160. The cycloidal gear 170 includes a plurality of radial outwardly extending lobes 171 and a plurality of radial inwardly extending recesses 172 disposed between the lobes 171. The lobes 171 and recesses 172 are configured to operatively couple with inner lobes 181 and inner recesses 182 of the outer gear 180. The number of the lobes 171 is dependent upon providing a drive ratio to achieve a desired mechanical advantage, as will be discussed below. A plurality of pin passages 173 are disposed through the cycloidal gear 170 adjacent the lobes 171. The number of pin passages 173 may be equivalent to the number of lobes 171. The pin passages 173 can be configured to receive the pins 163 of the pin gear 160. The pins 163 may rotate around a perimeter of or circumnavigate the pin passages 173 as the cycloidal gear 170 is driven in a cycloid shaped path by the eccentric shaft portion 127 of the drive axle 120. A passage 174 is disposed centrally through the cycloidal gear 170. A diameter of the passage 164 may be sized to accommodate the eccentric shaft portion 127 and allow the eccentric shaft portion 127 to rotate relative to the cycloidal gear 170.

The cycloidal gear 170 is disposed within a central passage 185 of the outer gear 180. As shown, the outer gear 180 includes a plurality of inner lobes 181 and inner recesses 182 disposed between the inner lobes 181. The inner lobes 181 are configured to be received by the recesses 172 of the cycloidal gear 170 and the inner recesses 182 are configured to receive the lobes 171 of the cycloidal gear 170. The cycloidal gear 170 may drive rotation of the outer gear 180 in the same direction as the direction of rotation of the drive axle 120. Thus, during use, the outer gear 180 is rotated in the same direction as the upper cap 111, which also causes the spool 250 to rotate in the same direction. This differs from harmonic drive systems in which a wave generator causes a flex spline and associated spool to rotate in a direction opposite the wave generator.

Figure 6A:
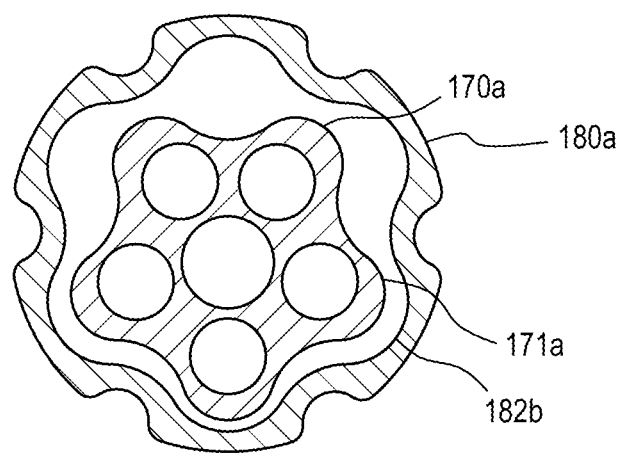
FIG. 6A is a top view of a cycloidal gear and an outer gear of the reel device of FIG. 1 having a drive ratio of 5:1.
Figure 6B:
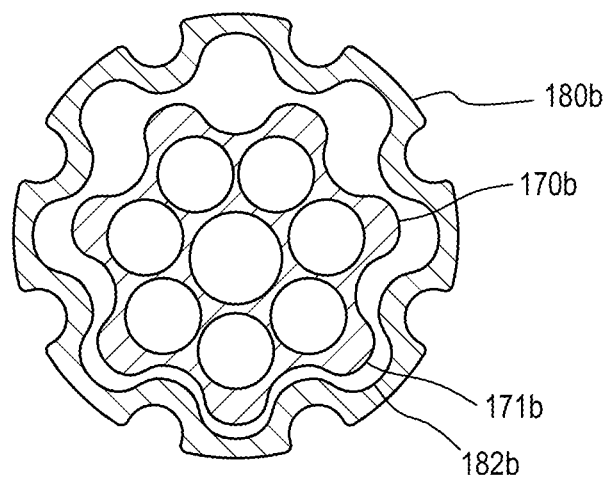
FIG. 6B is a top view of the cycloidal gear and the outer gear of the reel device of FIG. 1 having a drive ratio of 7:1.
Figure 6C:
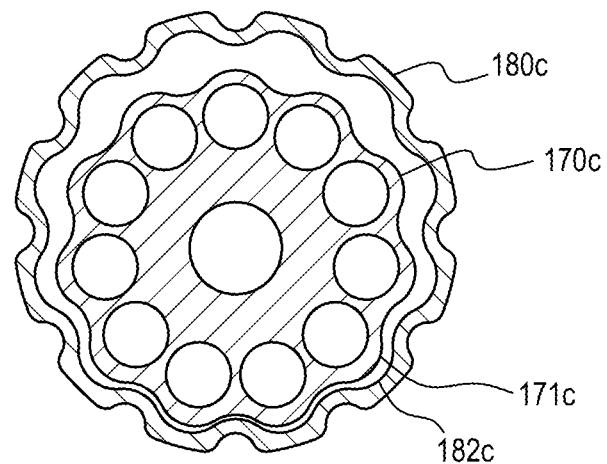
FIG. 6C is a top view of the cycloidal gear and the outer gear of the reel device of FIG. 1 having a drive ratio of 11:1.

The number of lobes 171 of the cycloidal gear 170 and the number of inner lobes 181 of the outer gear 180 can be varied and/or selected to achieve a drive ratio having a desired mechanical advantage. For example, FIG. 6A depicts a cycloidal gear 170a and an outer gear 180a having a drive ratio of 5:1. In other words, five rotations of the upper cap 111 produce one rotation of the outer gear 180a and the spool 250 (not shown). In this depicted embodiment, the number of lobes 171a is five and the number of inner recesses 182a is six. FIG. 6B depicts a configuration of a cycloidal gear 170b and an outer gear 180b having a drive ratio of 7:1 meaning that seven rotations of the upper cap 111 result in one rotation of the outer gear 180b and the spool 250. In this configuration, the number of lobes 171b is seven and the number of inner recesses 182b is eight. FIG. 6C depicts a configuration of a cycloidal gear 170c and an outer gear 180c having a drive ratio of 11:1 meaning that 11 rotations of the upper cap 111 result in one rotation of the outer gear 180c. In this configuration, the number of lobes 171c is 11 and the number of inner recesses 182c is 12. Other configurations of the cycloidal gear 170 and the outer gear 180 are also contemplated and are within the scope of this disclosure. The mechanical advantage provided by the drive assembly 110 provides a benefit of reduced effort by a user to tighten a cord of an adjustable member.

The pin gear 160, the cycloidal gear 170, and the outer gear 180 may be disposed within a lower cap 150. As illustrated in FIG. 4, the lower cap 150 includes a top portion 151 and a bottom portion 152. The top portion 151 includes retention clips 153 extending upwardly. The retention clips 153 slidingly couple the top portion 151 to channels or apertures 143 in the release disk 140. The top portion 151 may also include lateral protrusions 155 to fixedly couple the top portion 151 to channels or apertures 156 in the bottom portion 152. The top portion 151 may further include a central passage 157 through which the upper locking portion 161 of the pin gear 160 can rotatably extend.

The bottom portion 152 may include a plurality of recesses 154 and downwardly extending protrusions 158 configured to engage with the shift member 230 to prevent rotation of the lower cap 150 when the reel device 100 is in the shifted configuration.

The drive assembly 110 may further include a clip 192 (such as an e-clip) configured to couple with the screw 190 to retain the components of the drive assembly 110 within the cavity 113 of the upper cap 111.

As previously mentioned, the drive assembly 110 and its components may be modular. For instance, a user may selectively choose a first drive assembly 110 that is designed to provide a desired mechanical advantage during use. Optionally, one or more components of the first drive assembly 110 may be removed from the shift assembly 210 and replaced with a different drive assembly 110 (or components) that is designed to provide a different mechanical advantage. For instance, different drive assemblies 110 can be configured with cycloidal gears 170 and outer gears 180 having different drive ratios. Thus, the entirety of the reel device 100 need not be replaced to change the mechanical advantage that is desired. This can be advantageous as the base 211 of the shift assembly 210 can remain mounted and/or coupled to another device as the drive assembly 110 (or components thereof) is quickly replaced and exchanged for another drive assembly 110 (or components). In further embodiments, such as the embodiment of FIGS. 11-13, the cycloidal gear 470 and outer gear 480 can be removed and/or replaced as desired to achieve a particular drive ratio. Further, as previously mentioned, the drive assembly 110 can be configured with a tool-less release for ease and convenience in switching between different drive assemblies 110 and/or related components.

With continued reference to FIG. 4, the base 211 of the shift assembly 210 includes a sidewall 213 defining a cavity 217. A plurality of base ramps 212 are disposed around a perimeter of the cavity 217 adjacent a bottom of the cavity 217. A spool support member 219 is disposed at the bottom of the cavity 217. An insert holder 218 extends upwardly from the bottom of the cavity 217. The base 211 can also optionally comprise mounting members 216 for use in mounting the base 211 to another device (e.g., such as a prosthetic device). The mounting members 216 may be of any suitable configuration, such as feet (as shown in FIG. 4), a collar, threads, protrusions, etc.

At least one cord passage 214 is disposed through the sidewall 213. In some embodiments, the number of cord passages 214 may be two, three, four, or more. The cord passages 214 may be radially spaced at defined intervals, such as at about 180 degrees, 90 degrees, 45 degrees, etc. Other configurations are also contemplated. The base 211 may be configured to rotationally couple with the upper cap 111.

A torque control member 220 is shown adjacent the bottom of the cavity 217. The torque control member 220 may be a generally C-shaped spring member having a first end 221 and a second end 222. The first end 221 may be couplable to the base 211 and the second end 222 may be couplable to the shift member 230. The torque control member 220 may be configured to provide rotational resistance to the shift member 230. The torque control member 220 can also be adjusted to change a tension force required to rotate the shift member 230 during shifting. Alternatively, in certain embodiments a motor or solenoid member may be coupled to the shift member 230 to rotate the shift member 230 during shifting.

The shift member 230 is rotationally disposed within the cavity 217 of the base 211. As shown in the embodiment of FIG. 4, the shift member 230 may have a cylindrical shape. For instance, the shift member 230 can comprise a shift ring. In other embodiments, the shift member 230 may have another suitable shape. The shift member 230 includes an upper portion 234 and a lower portion 235. The upper portion 234 includes upwardly extending protrusions 236 configured to engage with the recesses 154 of the lower cap 150 when the reel device 100 is in the shifted configuration. The lower portion 235 includes a plurality of downwardly extending ramps 231 configured to slidingly couple with the base ramps 212. The lower portion 235 also includes downwardly extending protrusions 232. The protrusions 232 may include a plurality of channels or apertures 241 configured to receive the second end 222 of the torque control member 220. The apertures 241 can facilitate adjustment of the torque resistance when the reel device 100 is in use. For instance, the tension and torque required to rotate the shift member 230 and transition the reel device 100 to the shifted configuration can be selected and adjusted via changing the position of the torque control member 220 in the apertures 241. In other embodiments, the torque control member 220 can be replaced with a stronger (e.g., thicker) torque control member 220 to adjust the tension and torque required to rotate the shift member 230. In some embodiments, rotation of the shift member 230 in response to tension on the cord 193 may cause the cord 193 to be wound onto the spool 250 in a substantially repeatable and substantially uniform manner.

The shift member 230 further includes at least one cord passage 238 disposed through a wall of the shift member 230. The shift member 230 may include any suitable number of cord passages 238, such as two, three, four, or more. Further, the number of cord passages 238 may match the number of cord passages 214 disposed in the base 211. A cord groove 240 may also be disposed around a perimeter of the shift member 230. The cord groove 240 can be configured to align and allow the cord 193 to travel between the cord passage 238 of the shift member 230 and the cord passage 214 of the base 211.

The spool 250 may be disposed adjacent the shift member 230 on the spool support member 219 and over the insert holder 218 such that the spool 250 may be rotatable around the insert holder 218. The spool 250 includes an upper portion 251, a lower portion 252, and a cord receiving portion 253. The cord receiving portion 253 may be various depths and/or widths depending on the desired cord capacity of the spool 250. Further, spools 250 having different cord capacities may be interchanged without changing other elements of the reel device 100. Spools 250 can also be switched and/or replaced as the base 211 remains mounted and/or coupled to another device. The upper portion 251 includes a plurality of upwardly extending protrusions 254 configured to engage the outer recesses 184 of the outer gear 180 to rotate the spool 250 in the same direction as the outer gear 180 and the upper cap 111. In another embodiment, the outer gear 180 can be an integral component of the spool 250 rather than a separate component. The cord receiving portion 253 is disposed between the upper portion 251 and the lower portion 252. The cord receiving portion 253 is configured to receive the cord 193 and wind the cord 193 around a core of the spool 250. Cord start passages 256 extend from the cord receiving portion 253 through the upper portion 251 and the lower portion 252. In another embodiment, the cord start passages 256 may extend through a core of the spool 250. The cord start passages 256 are configured to facilitate securement of an end of the cord 193 to the spool 250 prior to uptake of the cord 193 by the spool 250. In the illustrated embodiment, the spool 250 comprises a single cord start passage 256. Additional cord start passages 256 can also be included. For instance, the spool 250 can include 2, 3, 4 or more cord start passages 256 disposed around the spool 250. It will thus be appreciated that one or a plurality of cords can be utilized with the reel device 100.

A threaded insert 191 may also be disposed within the insert holder 218. The insert 191 may be configured to threadingly couple with the screw 190 that extends through the drive axle 120 to couple the drive assembly 110 and the shift assembly 210 together.

Without limitation, any suitable type and/or variety of cord 193 can be used with the reel device 100 disclosed herein. For instance, the cord 193 may be an elongate flexible member comprising any suitable material, including, but not limited to, polymeric materials, metallic materials, and combinations thereof. In some embodiments, the cord 193 comprises polymeric materials such as nylon. In other embodiments, the cord 193 comprises metallic materials, such as steel. Other types of cords 193 can also be used. The cord 193 can also comprise braided materials as desired. The diameter and shape of the cord 193 may also vary depending on the application. For example, the transverse cross-sectional shape may be circular, triangular, square, oval, etc. The cord 193 can also be referred to as a tensioning member. In yet further embodiments, a strap member having a greater width than thickness can be used.

Figure 7A:
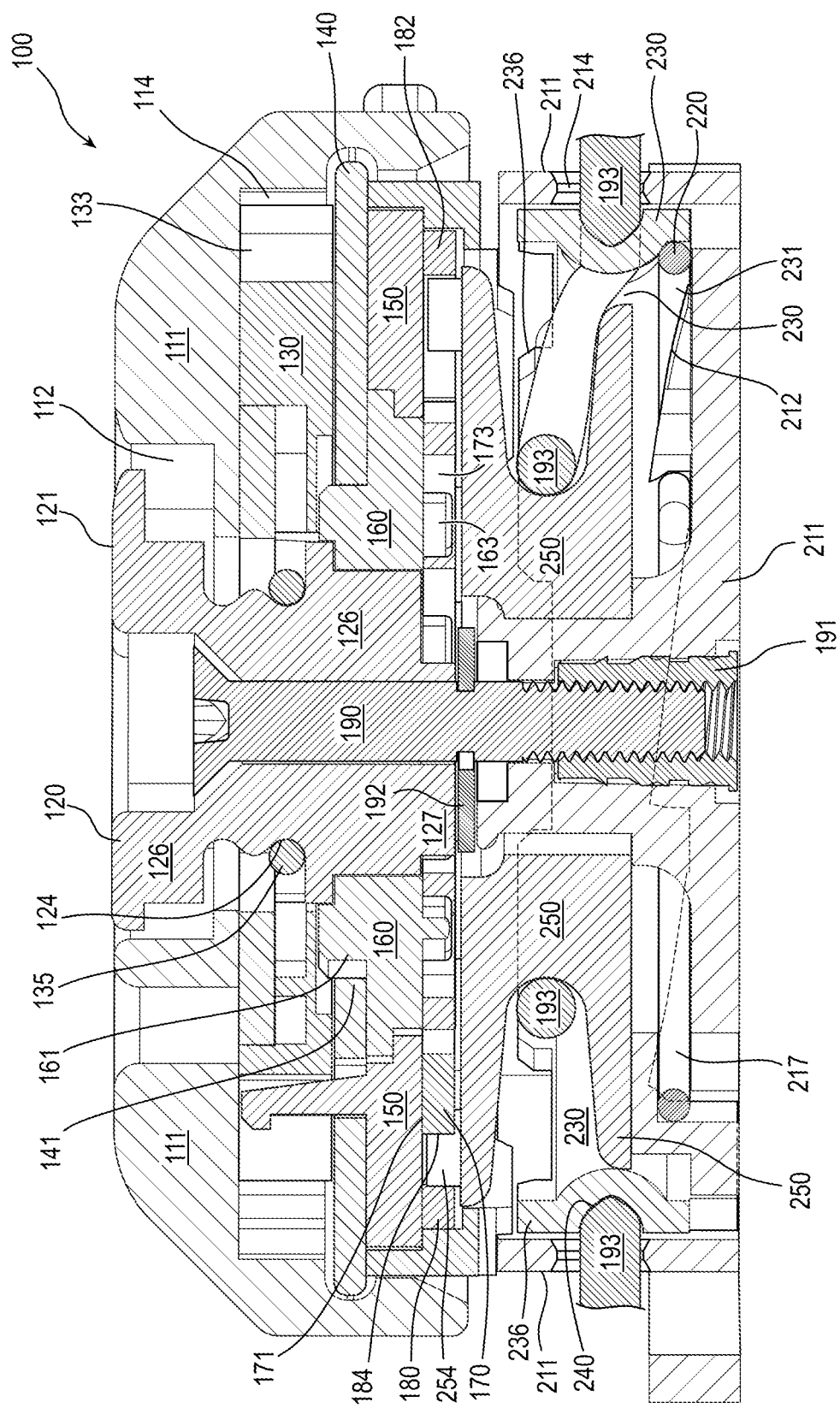
FIG. 7A is a cross-sectional view of the reel device of FIG. 1 in a pre-shifted configuration.
Figure 7B:
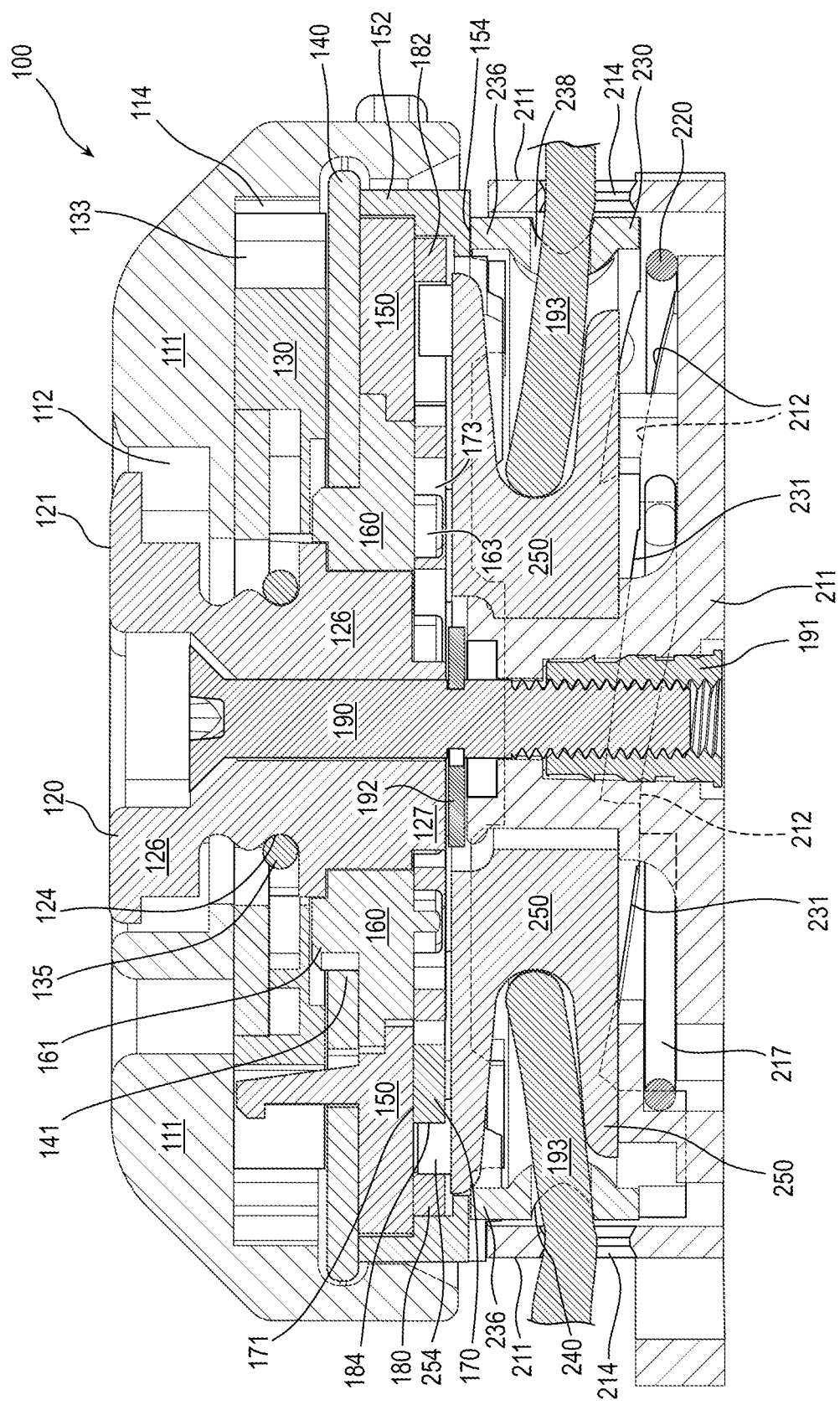
FIG. 7B is a cross-sectional view of the reel device of FIG. 1 in a shifted configuration.
Figure 7C:
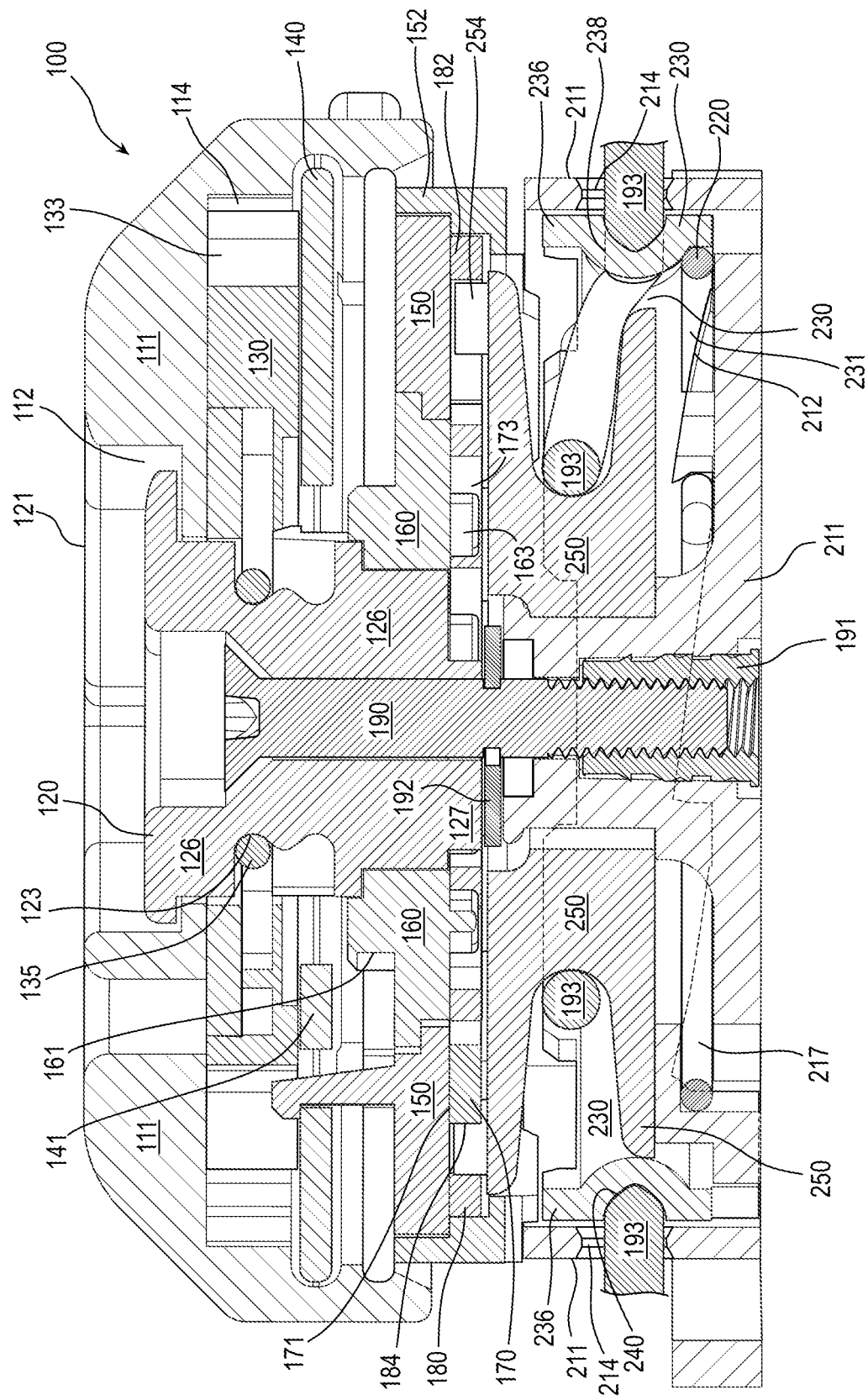
FIG. 7C is a cross-sectional view of the reel device of FIG. 1 in a released configuration.

FIGS. 7A-7C depict the reel device 100 in various configurations of operation. FIG. 7A depicts a cross-sectional view of the reel device 100 in a pre or non-shifted configuration. FIG. 7B depicts a cross-sectional view of the reel device 100 in a shifted configuration. FIG. 7C depicts a cross-sectional view of the reel device 100 in a released configuration.

Referring to FIG. 7A, in the pre or non-shifted configuration the upper cap 111 is positioned in a depressed state where the upper cap 111 is adjacent the base 211. The head 121 of the drive axle 120 is positioned in an upper portion of the recess 112 of the upper cap 111. The detents 133 of the rotational engagement member 130 are engaging the teeth 114 of the upper cap 111. The retention clip 135 of the rotational engagement member 130 is disposed in the lower groove 124 of the drive axle 120. The release disk 140 is coupled to the rotational engagement member 130. The lower cap 150 is coupled to the release disk 140 with substantially no separation between the two. The upper locking portion 161 of the pin gear 160 is disposed within the locking passage 141 of the release disk 140. The pins 163 of the pin gear 160 are disposed within the pin passages 173 of the cycloidal gear 170. The pin gear 160 is disposed around the centric shaft portion 126 of the drive axle 120. The outer recesses 184 of the outer gear 180 are engaging the upwardly extending protrusions 254 of the spool 250. The shift member 230 is positioned adjacent the bottom of the cavity 217 of the base 211 such that the ramps 231 are adjacent a bottom of the base ramps 212. The torque control member 220 is in a substantially non-torqued state. The ends of the cord 193 are coupled to the spool 250. The cord 193 passes through the cord passages 238 (not shown) of the shift member 230 and the cord passages 214 of the base 211. The cord passages 238 of the shift member 230 and the cord passages 214 of the base 211 are not aligned.

In the pre-shifted configuration, the upper cap 111 can be gripped and rotated by a user in a either a first or second direction. Alternatively, the upper cap 111 can be rotated by a motor coupled to the upper cap 111. As the upper cap 111 is rotated, the detents 133 of the rotational engagement member 130 engage with the teeth 114 of the upper cap 111 to facilitate rotation of the drive axle 120, the rotational engagement member 130, the release disk 140, the lower cap 150, the pin gear 160, the cycloidal gear 170, the outer gear 180, and the spool 250 at a 1:1 drive ratio (or an approximately 1:1 drive ratio), all in the same rotational direction. In other words, as the upper cap 111 is rotated once, the spool 250 is also rotated once, in the same rotational direction. This facilitates a rapid uptake of the cord 193 by the spool 250 to quickly reduce a slack length of the cord 193.

The pathway of the cord 193 in the pre or non-shifted configuration is as follows: the cord 193 travels through the cord passage 214 of the base 211, along the cord groove 240 around a portion of the shift member 230, though the cord passage 238 of the shift member 230, and around the spool 250. As the tension force on the cord 193 increases, the cord 193 applies a torque force on the shift member 230 to rotate the shift member 230 to a shifted position where the cord passages 214 of the base 211 align with the cord passages 238 of the shift member 230. This shifted position is referred to as the shifted configuration and is depicted in FIG. 7B. In some embodiments, this pathway of the cord 193 can provide a substantially repeatable and substantially uniform winding pattern around the spool 250. Without being bound to any particular theory, the tension force on the cord 193 as it travels from the cord passage 214 of the base 211 to the spool 250 can aid in providing this substantially repeatable and substantially uniform winding pattern. Further, in the depicted embodiment, two ends of the cord 193 are shown being wound around the spool 250. In other embodiments, only one end of the cord 193 is configured to be wound around the spool 250. For instance, the second end of the cord 193 may be coupled to the reel device 100 at a location such that it is fixed and does not wind around the spool 250. In another instance, the second end of the cord 193 can be coupled to a separate device entirely (such as the adjustable device for which the reel device 100 is configured for use). More than one cord 193 can also be used (e.g., one or both ends of two or more separate cords can be coupled to and wound around the spool 250.)

Referring to FIG. 7B, in the shifted configuration the upper cap 111 is positioned in a depressed state where the upper cap 111 is adjacent the base 211. The head 121 of the drive axle 120 is positioned in an upper portion of the recess 112 of the upper cap 111. The detents 133 of the rotational engagement member 130 are releasably engaging the teeth 114 of the upper cap 111. The retention clip 135 of the rotational engagement member 130 is disposed in the lower groove 124 of the drive axle 120. The release disk 140 is coupled to the rotational engagement member 130. The lower cap 150 is coupled to the release disk 140 with essentially no separation between the two. The upper locking portion 161 of the pin gear 160 is disposed within the locking passage 141 of the release disk 140. The pins 163 of the pin gear 160 are disposed within the pin passages 173 of the cycloidal gear 170. The pin gear 160 is disposed around the centric shaft portion 126 of the drive axle 120. At least one of the lobes 171 of the cycloidal gear 170 is coupled with the inner recesses 182 of the outer gear 180. The cycloidal gear 170 is disposed around the eccentric shaft portion 127 of the drive axle 120. The outer recesses 184 of the outer gear 180 are engaging the upwardly extending protrusions 254 of the spool 250. The upwardly extending protrusions 236 of the shift member 230 are engaging the recesses 154 of the lower cap 150. The ramps 231 are disposed adjacent a top of the base ramps 212 such that the shift member 230 is shifted upwards. The cord 193 is partially wrapped around the spool 250 and passes through the cord passages 238 of the shift member 230 and the cord passages 214 of the base 211. The cord passages 238 and the cord passages 214 are aligned.

As previously discussed, the reel device 100 can be automatically transitioned from the pre or non-shifted configuration to the shifted configuration when the upper cap 111 is gripped and rotated by a user in a single direction. For example, as the upper cap 111 is rotated, tension is increased on the cord 193 causing an increased torque force on the shift member 230. This increased torque force causes the shift member 230 to be partially rotated. During the partial rotation of the shift member 230, the ramps 231 slidingly engage with the base ramps 212, causing the shift member 230 to move upward and the cord passages 238 of the base 211 and the cord passages 214 of the shift member 230 to align. When the shift member 230 is moved upwards, the upwardly extending protrusions 236 engage with the recesses 154 of the lower cap 150. When the shift member 230 engages with the lower cap 150, rotation of the lower cap 150, the release disk 140, and the rotational engagement member 130 is prevented.

As the upper cap 111 continues to be rotated, the detents 133 of the rotational engagement member 130 releasably engage with the teeth 114 as the rotational engagement member 130 is prevented from rotating with the upper cap 111. As the detents 133 releasably engage with the teeth 114, an audible and/or tactile feedback indicator is provided to the user to indicate the reel device 100 has automatically shifted to the shifted configuration. The audible and/or tactile feedback indicator may additionally allow the user to dial in a known and/or substantially repeatable cord tension. The audible and/or tactile feedback indicator may indicate 90, 180, 270, and 360 degrees rotation of the upper cap 111. Other audible and/or tactile feedback indicators are also within the scope of this disclosure. The drive axle 120 continues to be rotated by the upper cap 111. The pin gear 160 remains rotationally stationary as the eccentric shaft portion 127 drives the cycloidal gear 170 in a cycloidal shaped path. The pin passages 173 of the cycloidal gear 170 are circumscribed by the stationary pins 163 to define the cycloid shaped path. As the cycloidal gear 170 is driven in the cycloid shaped path, the lobes 171 of the cycloidal gear 170 engage with the inner lobes 181 and inner recesses 182 of the outer gear 180 to drive rotation of the outer gear 180 and the spool 250 in the same direction as the rotation of the upper cap 111 and drive axle 120.

In the shifted configuration, the 1:1 drive ratio (or approximately 1:1 drive ratio) of the upper cap 111 and the spool 250 is stopped as the reel device 100 transitions to a different drive ratio that may provide mechanical advantage. The engagement of the cycloidal gear 170 with the outer gear 180 produces a drive ratio that provides a mechanical advantage to the reel device 100. A range of drive ratios may be from about 2:1 to about 15:1 (or higher, such as from about 4:1 to about 15:1, 20:1, 25:1, 30:1, 40:1, 60:1, 70:1, 80:1, 90:1, 100:1, 110:1, 120:1, 130:1, 140:1, or 150:1). This results in increased tension on the cord 193 with less rotational force on the upper cap 111. For example, in the shifted configuration, when the drive ratio is 4:1, the user can rotate the upper cap 111 four rotations to achieve one rotation of the spool 250.

In some embodiments, the user may reverse rotation of the upper cap 111 to unwind the cord 193 or lessen the tension. In certain embodiments, engagement of the cycloidal gear 170 with the outer gear 180 prevents rotation of the spool 250 in the reverse direction absent the user rotating the upper cap 111. Thus, the tension on the cord 193 may remain absent reverse rotation of the upper cap 111. In other embodiments, the reel device 100 may be prevented from reverse rotation without transitioning the reel device 100 to a released configuration. In yet other embodiments, the reel device 100 may comprise a selective backcheck feature configured to prevent inadvertent rotation of the upper cap 111 in the reverse direction (e.g., the direction opposite of the winding direction). In yet another embodiment, the reel device 100 may include an adjustable clutch mechanism to prevent over-tensioning of the cord 193 and to permit the user to tighten the cord 193 to a repeatable tightness. The clutch mechanism may allow the drive assembly 110 to slip when a threshold tension force on the cord 193 is exceeded. The clutch mechanism can also be tunable to a desired threshold tension force. Further, when the cord tension and torque forces reduce to below the threshold tension and torque forces, the reel device can automatically de-shift or transition back to the pre-shifted configuration. It will further be appreciated that the reel device 100 can work in either direction. For instance, if you begin tightening the reel device 100 by rotating the upper cap 111 in the clockwise direction, a counterclockwise rotation of the upper cap 111 can unwind or loosen the cord 193. Similarly, if you begin tightening the reel device 100 by rotating the upper cap 111 in the counterclockwise direction, a clockwise rotation of the upper cap 111 can unwind or loosen the cord 193.

In some embodiments, the reel device 100 can further include a release configuration for quick or rapid release of the cord 193. Such a release configuration, shown in FIG. 7C, can be obtained by pulling the upper cap 111 upwards. Referring to FIG. 7C, in the release configuration, the upper cap 111 is positioned in a raised state where the upper cap 111 is spaced apart from the base 211. The head 121 of the drive axle 120 is positioned in a lower portion of the recess 112 of the upper cap 111. The detents 133 of the rotational engagement member 130 are engaging the teeth 114 of the upper cap 111. The retention clip 135 of the rotational engagement member 130 is disposed in the upper groove 123 of the drive axle 120 to retain the upper cap 111 in the raised position. The release disk 140 is coupled to the rotational engagement member 130. The lower cap 150 is coupled to the release disk 140 with separation between the two. The upper locking portion 161 of the pin gear 160 is displaced from the locking passage 141 of the release disk 140, allowing the spool 250 to freely rotate and the tension force on the cord 193 to be released.

With continued reference to FIG. 7C, the pins 163 of the pin gear 160 remain disposed within the pin passages 173 of the cycloidal gear 170, with the pin gear 160 disposed around the centric shaft portion 126 of the drive axle 120. The outer recesses 184 of the outer gear 180 are engaging the upwardly extending protrusions 254 of the spool 250. The shift member 230 has moved back down the base ramps 212 such that it is positioned adjacent the bottom of the cavity 217 of the base 211. The torque control member 220 has transitioned to a substantially non-torqued state as the tension on the cord 193 has been released. Absent tension on the cord 193, the cord passages 238 of the shift member 230 and the cord passages 214 of the base 211 have also transitioned back to a non-aligned orientation.

The reel device 100 can be transitioned from the pre or non-shifted and shifted configurations to the released configuration when the upper cap 111 is gripped and displaced upward. As the upper cap 111 is displaced, the rotational engagement member 130 and the release disk 140 are also displaced upwardly relative to the lower cap 150. When the release disk 140 is displaced upwardly, the pin gear 160 disengages from the release disk 140 to allow free rotation of the pin gear 160, the cycloidal gear 170, the outer gear 180, and the spool 250. This free rotation allows the cord 193 to be rapidly unwound from the spool 250 by applying an outwardly directed force to the cord 193.

In the released configuration, the reel device 100 may also provide a visual feedback indicator that indicates the reel device 100 is in the released configuration. In the illustrated embodiment of FIG. 7C, the visual feedback indicator is exposure of a wall of the upper portion of the recess 112 of the upper cap 111. In some embodiments, the wall may include a color that is easily visible, such as red, blue, green, etc. In another embodiment, the visual feedback indicator may be exposure of a portion of the shift member 230 between the upper cap 111 and the base 211. Other visual feedback indicators are also within the scope of this disclosure. The reel device 100 may also provide a tactile feedback to indicate that the reel device 100 has been transitioned to the released configuration. In the illustrated embodiment of FIG. 7C, the tactile indicator can be caused by movement of the retention clip 135 of the rotational engagement member 130 from the lower groove 124 to the upper groove 123 of the drive axle 120. Other tactile feedback indicators are also within the scope of this disclosure.

In some embodiments, the disclosed reel device 100 can be configured as a low-profile device with a minimal height or thickness having good rotational mechanical advantage. For instance, without limitation, it will be appreciated that the reel device 100 (and the reel device 400 of FIGS. 11-13) may have an overall height ranging from about mm to about 25.0 mm, or from about 17.0 mm to about 23.0 mm in the pre or non-shifted, shifted, and released configurations. Such a height may be accomplished through a relatively small thickness of the cycloidal gear 170. For example, the thickness of the cycloidal gear 170 can range from about 0.5 mm to about 3.0 mm, or from about 1.0 mm to about 3.0 mm. Thus, the range of a ratio of the overall height in the pre or non-shifted and shifted configurations to the thickness of the cycloidal gear 170 can be from about 5:1 to about 20:1. In other embodiments, the reel device 100 may be scalable to any suitable physical size dependent upon its application. For instance, the reel device 100 may have an overall height ranging from as small as about 10.0 mm to 12.0 mm to as large as 50.0 mm or larger in the pre or non-shifted, shifted, and released configurations The reel device 100 can also be classified by its gear ratio in relation to its relatively small size. For instance, in some embodiments, the gear ratio of the reel device 100 can be between about 4:1 and about 100:1, the thickness of the cycloidal gear 170 can be between about 1.0 mm to about 3.0 mm, and/or the thickness of the reel device 100 may be between about 15.0 mm to about 25.0 mm.

As can be appreciated, the reel device 100 may also be used to adjust a cord on various types of articles and devices. For example, the reel device 100 may be used to adjust one or more of a medical device, a prosthetic device, an orthotic device, a shoe, a boot, a ski boot, a snowboard boot, clothing apparel (such as a coat), a helmet, etc. Use of the reel device 100 on other types of devices are also contemplated, including, but not limited to different types of equipment (including, but not limited to, industrial equipment, outdoor equipment, and sporting equipment), protective products, securing straps, robotics, packs, luggage, action sports products, etc.

Figure 10:
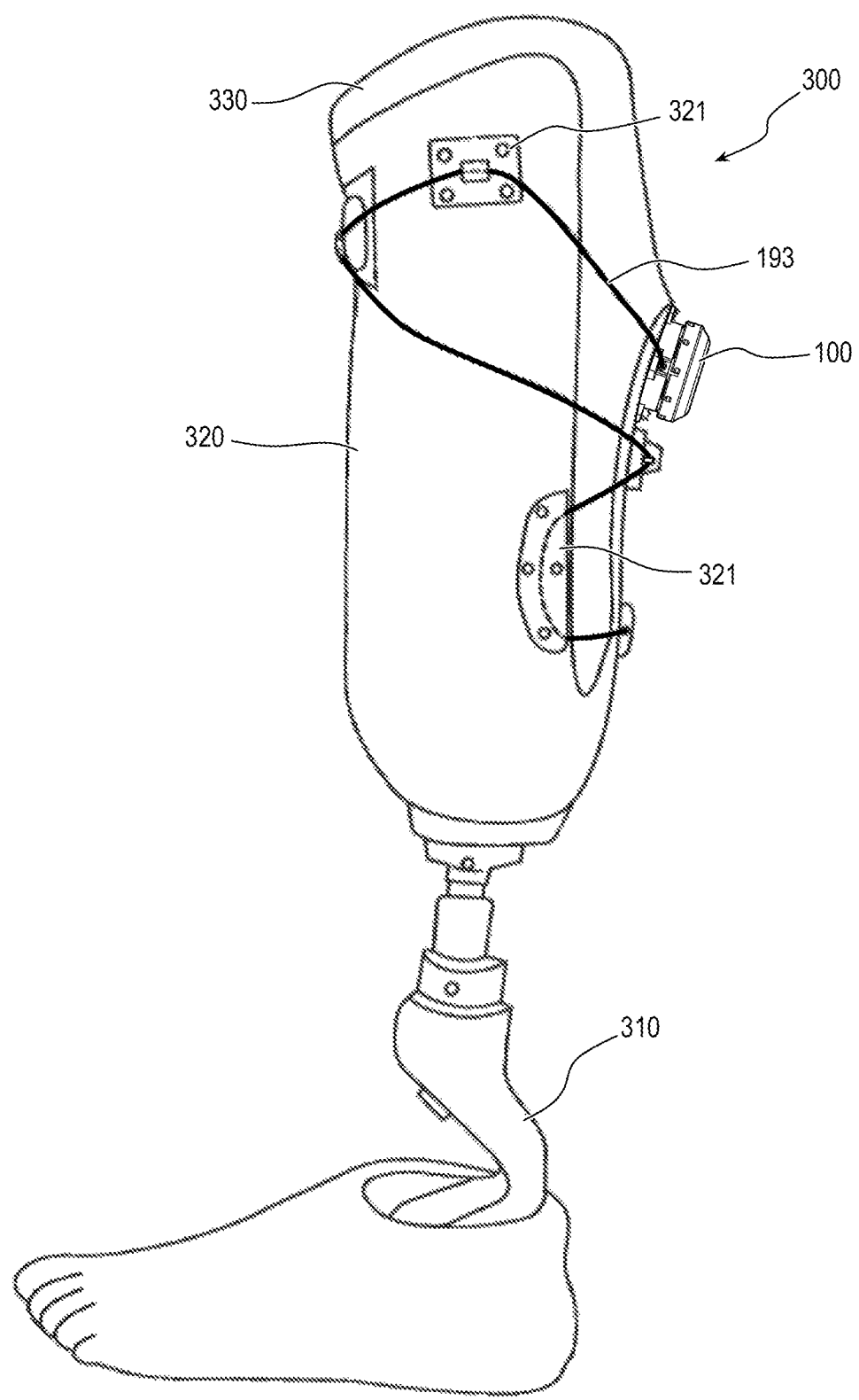
FIG. 10 is a view of an adjustable prosthetic system.

As an example, in a certain embodiment, the reel device 100 may be a component of an adjustable prosthetic system 300 that comprises a prosthesis 310, the reel device 100, the cord 193, an adjustable member 320, and a socket 330, as shown in FIG. 10. The prosthesis 310 may be configured for use with residual portions (i.e., residuum) of an amputated leg, such as a leg that has undergone a transfemoral (i.e., above-knee) or transtibial (i.e., below-knee) amputation and an amputated arm (e.g., after an above-elbow or below-elbow amputation).

With continued reference to FIG. 10, the reel device 100 may be coupled to the prosthesis 310 using any suitable technique. For example, the reel device 100 may be coupled using fasteners, bonding, welding, etc. The adjustable member 320 may partially surround the socket 330. The cord 193 may be threaded through a plurality of guide members 321 that are coupled to the adjustable member 320. In some embodiments, the adjustable prosthetic system may include a motor operably coupled to the reel device 100 and configured to operate the reel device 100 to adjust the adjustable member 320.

In use, the residuum may be inserted into the socket 330 of the adjustable prosthetic system 300. The cord 193 may be threaded through the guide members 321 of the adjustable member 320 and coupled to the reel device 100. The reel device 100 may be actuated as previously described to tighten the cord 193 such that a shape of the adjustable member 320 is adjusted to provide a better fit of the socket 330 to the residuum. Other uses are also contemplated.

FIGS. 11-13 depict another embodiment of a reel device that resembles the reel device 100 described above in certain respects. Accordingly, like features are designated with like reference numerals, with the leading digit incremented to "4." For example, the embodiment depicted in FIGS. 11-13 includes a drive assembly 410 that may, in some respects, resemble the drive assembly 110 of FIG. 1. Relevant disclosure set forth above regarding similarly identified features thus may not be repeated hereafter. Moreover, specific features of the reel device 100 and related components shown in FIGS. 1-10 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the reel device 400 and related components depicted in FIGS. 11-13. Any suitable combination of the features, and variations of the same, described with respect to the reel device 100 and related components illustrated in FIGS. 1-10 can be employed with the reel device 400 and related components of FIGS. 11-13, and vice versa. This pattern of disclosure applies equally to further embodiments depicted in subsequent figures and described hereafter, wherein the leading digits may be further incremented.

FIGS. 11-13 depict another embodiment of a reel device 400. As shown in FIG. 11, the reel device 400 is generally comprised of a drive assembly 410, a shift assembly 510, and a collar 515. As illustrated in the exploded view of the reel device 400 of FIG. 12, the drive assembly 410 may include one or more of an upper cap or upper member 411, a drive axle 420, a lower cap or lower member 450, a pin gear 460, a cycloidal gear 470, an outer gear 480, and/or a spool 550; and the shift assembly 510 may comprise one or more of a base 511, a torque control member 520 (such as a spring), and/or a shift member 530. The drive assembly 410 and/or the shift assembly 510 may be provided to a user in various configurations to accommodate a variety of uses. For example, the drive assembly 410 may be provided with any variety of selected drive mechanisms that facilitate different mechanical advantage ratios and/or the drive assembly 410 may be provided with a variety of different spool capacities to accommodate different cord lengths, etc. The drive assembly 410 and/or shift assembly 510 (or components thereof) may also be interchangeable with a differently configured drive assembly and/or shift assembly (or related components) using any suitable tool-based or tool-less technique. For instance, a first cycloidal gear 470 and a first outer gear 480 can be substituted with a second cycloidal gear 470 and a second outer gear 480 to achieve a different drive ratio.

The upper cap 411 is generally circular shaped. The upper cap 411 can include a recess 412 disposed in an upper surface. The recess 412 can be sized and shaped to receive a head 421 of the drive axle 420. A drive axle passage 417 can extend through the upper cap 411. The upper cap 411 may include a clutch 446 including a threaded passage 416 in communication with the drive axle passage 417. The threaded passage 416 can receive a pin 418, a resilient member 419, and an adjustable member 425 (e.g., threaded set screw).

As illustrated in FIGS. 12 and 13, the upper cap 411 includes a cavity 413 for selective disposition of the lower cap 450. The cavity 413 can include one or more sockets 437 configured to receive and retain one or more latch member 439 (e.g., spring ball member). The lower cap 450 is generally disk shaped and includes a plurality of recesses or dimples 444 (shown in FIG. 12) configured to receive the ball of the latch member 439. The dimples 444 can be disposed on a top portion 451 in a circular pattern adjacent a perimeter of the top portion 451. The lower cap 450 also includes one or more recesses 454 disposed in a circular pattern adjacent a perimeter of a bottom portion 452. The recesses 454 can receive upwardly extending protrusions 536 of the shift member 530 to engage the lower cap 450 with the shift member 530. Further, the lower cap 450 includes one or more pins 459 extending away from the bottom portion 452. The pins 459 may be disposed in a circular pattern. The pins 459 can be received within pin passages 465 of the pin gear 460. A central passage 466 is disposed through the lower cap 450. The central passage 466 is sized to accommodate a centric shaft portion 426 of the drive axle 420 such that drive axle 420 can be rotated relative to the lower cap 450. The cavity 413 further includes an internal threaded passage 416 configured to receive a retention ring 445. The retention ring 445 can retain the lower cap 450 within the cavity 413.

The drive axle 420 is shown in FIG. 12 to include the head 421, the centric shaft portion 426, and an eccentric shaft portion 427. As discussed previously, the head 421 is configured to be disposed within the recess 412 of the upper cap 411. The centric shaft portion 426 extends downwardly from the head 421. The centric shaft portion 426 may have a diameter smaller than the head 421 and larger than the eccentric shaft portion 427. The centric shaft portion 426 can extend through and rotate within the lower cap 450 and the pin gear 460. A pin recess 419 is disposed in the centric shaft portion 426 and is configured to be operatively coupled with the pin 418 for operation of the clutch 446.

The eccentric shaft portion 427 extends downwardly from the centric shaft portion 426. A central vertical axis of the eccentric shaft portion 427 is radially offset from a longitudinal axis of the drive axle 420. The eccentric shaft portion 427 can be configured to be rotationally coupled to the cycloidal gear 470. A threaded bolt 494 can be coupled to the drive axle 420 adjacent the eccentric shaft portion 427 to retain the drive assembly 410 proximate to the shift assembly 510. As desired, the drive axle 420 can be threaded/unthreaded from the bolt 494 to couple and/or uncouple the drive assembly 410 and the shift assembly 510.

The pin gear 460 is disposed between the lower cap 450 and the cycloidal gear 470. As illustrated, the pin gear 460 includes an upper portion 461 and a lower portion 462. The upper portion 461 includes a plurality of pin passages 465 configured to receive the pins 459 of the lower cap 450. The number of pin passages 465 may be equivalent to the number of pins 459. A plurality of gear pins 463 extend downwardly from the lower portion 462. The gear pins 463 are disposed in a circular pattern adjacent a perimeter of the lower portion 462. The number of gear pins 463 may be equivalent to the number of pin passages 473 of the cycloidal gear 470. A central passage 464 is disposed through the pin gear 460. The central passage 464 is sized to accommodate the centric shaft portion 426 of the drive axle 420 such that the drive axle 420 can be rotated relative to the pin gear 460.

The cycloidal or wobble gear 470 is disposed adjacent the pin gear 460. The cycloidal gear 470 includes a plurality of radial outwardly extending lobes 471 and a plurality of radial inwardly extending recesses 472 disposed between the lobes 471. The lobes 471 and recesses 472 are configured to operatively couple with inner lobes 481 and inner recesses 482 of the outer gear 480. A plurality of pin passages 473 are disposed through the cycloidal gear 470 adjacent the lobes 471. The pin passages 473 can be configured to receive the gear pins 463 of the pin gear 460. The gear pins 463 may rotate around a perimeter of or circumnavigate the pin passages 473 as the cycloidal gear 470 is driven in a cycloid shaped path by the eccentric shaft portion 427 of the drive axle 420 as the drive axle 420 is rotated. A passage 474 is disposed centrally through the cycloidal gear 470. A diameter of the passage 464 may be sized to accommodate the eccentric shaft portion 427 and allow the eccentric shaft portion 427 to rotate relative to the cycloidal gear 470.

The cycloidal gear 470 is disposed within the outer gear 480. As shown, the outer gear 480 includes a plurality of inner lobes 481 and inner recesses 482 disposed between the inner lobes 481. The inner lobes 481 are configured to be received by the recesses 472 of the cycloidal gear 470 and the inner recesses 482 are configured to receive the lobes 471 of the cycloidal gear 470. As discussed with the embodiment of FIGS. 1-4, the cycloidal gear 470 may drive rotation of the outer gear 480 in the same direction as the direction of rotation of the drive axle 420 and/or upper cap 411.

As previously mentioned, a portion of the drive assembly 410 may be modular. For instance, a user may selectively choose a first drive assembly 410 that is designed to provide a desired mechanical advantage during use. Optionally, components of the first drive assembly 410 may be replaced with different components that are designed to provide a different mechanical advantage. For instance, different cycloidal gears 470 and outer gears 480 having different drive ratios may be used. Thus, the entirety of the reel device 400 need not be replaced to change the mechanical advantage that is desired. This can be advantageous as the collar 515 of the shift assembly 510 can remain mounted and/or coupled to another device as the components of the drive assembly 410 are quickly replaced and exchanged for other components.

With continued reference to FIG. 12, the base 511 of the shift assembly 510 includes a sidewall 513 defining a cavity 517. One or a plurality of slots 512 are disposed in the sidewall 513. The slots 512 include a lower portion and an upper portion. A spool support member 519 is disposed centrally within the cavity 517. The threaded bolt 494 extends through the spool support member 519. The base 511 can be removably disposed within the collar 515. A clip 516 can releasably retain the base 511 within the collar 515. The collar 515 may be mounted to another device (e.g., such as a prosthetic device or orthotic device).

At least one cord passage 514 is disposed through the sidewall 513. In some embodiments, the number of cord passages 514 may be two, three, four, or more. The cord passages 514 may be radially spaced at defined intervals, such as at about 180 degrees, 90 degrees, 45 degrees, etc. Other configurations are also contemplated.

A torque control member 520 is disposed within the cavity 517. In some embodiments, the torque control member 520 is disposed within a sleeve, slot, or channel within the cavity 517. The torque control member 520 may be a resilient member (e.g., such as a compression spring) having a first end and a second end. The first end may be couplable to or otherwise interface with the base 511 and the second end may be couplable to or otherwise interface with the shift member 530. The torque control member 520 may be configured to provide rotational resistance to the shift member 530 to prevent the shift member 530 from rotating until a threshold rotational force is exceeded. Further, the torque control member 520 can apply a rotational force to the shift member 530 causing and/or biasing the shift member 530 to rotate from a shifted configuration to a pre or non-shifted configuration. The torque control member 520 can also be tunable and/or modified to adjust the threshold rotation force that is required to rotate the shift member 530. For instance, a torque control member 520 comprising a resilient member (e.g., a compression spring) can be substituted with another resilient member or otherwise modified to change the properties of the torque control member 520 as desired.

The shift member 530 is rotationally disposed within the cavity 517 of the base 511. As shown in the embodiment of FIG. 12, the shift member 530 may have a cylindrical shape. For instance, the shift member 530 can comprise a shift ring. In other embodiments, the shift member 530 may have another suitable shape. The shift member 530 includes upwardly extending protrusions 536 configured to engage with the recesses 454 of the lower cap 450 when the reel device 400 is in the shifted state.

The shift member 530 further includes at least one cord passage 538 disposed through a wall of the shift member 530. The shift member 530 may include any suitable number of cord passages 538, such as two, three, four, or more. Further, the number of cord passages 538 may match the number of cord passages 514 disposed in the base 511. A cord groove 540 may also be disposed around a perimeter of the shift member 530. The cord groove 540 can be configured to align and allow the cord 493 (not shown) to travel between the cord passage 538 of the shift member 530 and the cord passage 514 of the base 511.

The shift member 530 includes at least one slot pin 529 extending radially outward from the side wall. The slot pin 529 is configured to be slidably disposed within the slot 512 of the base 511. In some embodiments, the slot pin 529 may be an integral part of the shift member 530. In other embodiments, the slot pin 529 may be a bolt (e.g., hex bolt) threadingly coupled to the shift member 530. If desired, a plurality of slot pins 529 can be used, such as 2, 3, 4 or more. For instance, in some embodiments, a plurality of slot pins 529 are slidably disposed within a plurality of slots 512 that are disposed around the circumference of the base 511.

The spool 550 may be disposed adjacent the shift member 530 on the spool support member 519 such that the spool 550 may be rotatable around spool support member 519. The spool 550 can be coupled with the outer gear 480 to rotate the spool 550 in the same direction as outer gear 480 and the upper cap 411. In some embodiments, the spool 550 is integral with the outer gear 480. In other embodiments, the spool 550 and outer gear 480 are separate components coupled together.

During use, the upper cap 411 of the reel device 400 is positioned adjacent the base 511. The head 421 of the drive axle 420 is positioned in the recess 412 of the upper cap 411.

An end of the pin 418 of the clutch 446 is disposed in the pin recess 419 of the drive axle 420. The pin 418 is pressed into the pin recess 419 by an adjustable force applied by the adjustable member 425 to allow the upper cap 411 to rotate the drive axle 420 until a desired threshold rotational force is exceeded. When the desired threshold rotational force is exceeded, the pin 418 is displaced from the pin recess 419 allowing the upper cap 411 to be rotated without rotation of the drive axle 420. The force applied to the pin 418 can be adjusted by rotation of the adjustable member 425 by a tool. For example, the adjustable member 425 can be rotated clockwise to increase the force applied to the pin 418 resulting in an increase in the rotational release force. Adjusting the force applied to the pin 418 can modify the desired threshold force that is required to activate the clutch 446 and allow the upper cap 411 to rotate without rotation of the drive axle 420.

When the reel device 400 is in the pre or non-shifted configuration, the lower cap 450 is disposed within the cavity 413 of the upper cap 411. The balls of the latch members 439 are disposed within the dimples 444 of the lower cap 450 such that the lower cap 450 is rotationally engaged with the upper cap 411. The pins 459 of the lower cap 450 are disposed within the pin passages 465 of the pin gear 460. The gear pins 463 of the pin gear 460 are disposed within the pin passages 473 of the cycloidal gear 470. The pin gear 460 is disposed around the centric shaft portion 426 of the drive axle 420. The shift member 530 is positioned adjacent the bottom of the cavity 519 of the base 511 such that the slot pins 529 are disposed in the vertical portion of the slot 512. The torque control member 520 is in a substantially non-compressed state. At a user's discretion, an end of the cord 493 can be coupled to the spool 550 (e.g., such as via one or more cord start passages 556). The cord 493 can pass through a cord passage 538 of the shift member 530 and a cord passage 514 of the base 511. The cord passages 538 of the shift member 530 and the cord passages 514 of the base 511 are not aligned.

In the pre or non-shifted configuration, the upper cap 411 can be gripped and rotated by a user in a first direction (e.g., either clockwise or counterclockwise) to apply tension to the cord 493. As the upper cap 411 is rotated, the pin 418 engages with the pin recess 419 and the latch members 439 engage with the dimples 444 of the lower cap 450 to facilitate rotation of the drive axle 420, the lower cap 450, the pin gear 460, the cycloidal gear 470, the outer gear 480, and the spool 550 at a 1:1 drive ratio (or an approximately 1:1 drive ratio), all in the same rotational direction. In other words, as the upper cap 411 is rotated approximately once, the spool 550 is also rotated approximately once, in the same rotational direction. This facilitates a rapid uptake of the cord 493 by the spool 550 to quickly reduce a slack length of the cord 493.

The reel device 400 can be automatically transitioned from the pre or non-shifted configuration to the shifted configuration as the tension of the cord 493 is increased via rotation of the upper cap 411. For example, as the upper cap 411 is rotated, tension is increased on the cord 493 causing an increased torque force on the shift member 530. This increased torque force causes the shift member 530 to be rotated as the cord moves the cord passage 538 of the shift member 530 and the cord passage 514 of the base 511 into alignment. As the shift member 530 rotates, the torque control member 520 is also compressed, resulting in a force in the opposite direction that opposes rotation of the shift member 530. When the tension and torque force from the cord 493 exceeds a threshold level (e.g., the level of force applied from the torque control member 520), the shift member 530 will rotate to the shifted configuration. During the rotation of the shift member 530, slot pins 529 are displaced from the lower portion of the slot 512 to the upper portion of the slot 512 causing the shift member 530 to move upward as the cord passages 538 of the base 511 and the cord passages 514 of the shift member 530 align. The rotation of the shift member 530 may be further restrained until a threshold tension is exceeded due to a shoulder transition of the lower portion to the upper portion of the slot 512. In other words, the slot pins 529 are restrained from transitioning from the lower portion to the upper portion of the slots 512 until a threshold tension on the cord 493 is exceeded because the slot pins 529 are required to pass over the transition shoulder resulting in a sudden shift of the shift member 530. When the shift member 530 is moved upwards, the upwardly extending protrusions 536 engage with the recesses 454 of the lower cap 450. When the shift member 530 engages with the lower cap 450, rotation of the lower cap 450 is prevented.

As the upper cap 411 continues to be rotated, the latch members 439 releasably engage with the dimples 444 as the lower cap 450 is prevented from rotating with the upper cap 411. As the latch members 439 releasably engage with the dimples 444, an audible and/or tactile feedback indicator (e.g., a click) is provided to the user to indicate the reel device 400 has automatically shifted to the shifted configuration. The audible and/or tactile feedback indicator may additionally allow the user to dial in a known and/or substantially repeatable cord tension. The drive axle 420 continues to be rotated by the upper cap 411. The pin gear 460 remains rotationally stationary as the eccentric shaft portion 427 drives the cycloidal gear 470 in a cycloidal shaped path. The pin passages 473 of the cycloidal gear 470 are circumscribed by the stationary gear pins 463 to define the cycloid shaped path. As the cycloidal gear 470 is driven in the cycloid shaped path, the lobes 471 of the cycloidal gear 470 engage with the inner lobes 481 and inner recesses 482 of the outer gear 480 to drive rotation of the outer gear 480 and the spool 550 in the same direction as the rotation of the upper cap 411 and drive axle 420.

In the shifted configuration, the 1:1 drive ratio (or approximately 1:1 drive ratio) of the upper cap 411 and the spool 550 is stopped as the reel device 400 transitions to a different drive ratio that may provide mechanical advantage. The engagement of the cycloidal gear 470 with the outer gear 480 produces a drive ratio that provides a mechanical advantage to the reel device 400. A range of drive ratios may be from about 2:1 to about 15:1 (or higher, such as from about 4:1 to about 15:1, 20:1, 25:1, 30:1, 40:1, 60:1, 70:1, 80:1, 90:1, 100:1, 110:1, 120:1, 130:1, 140:1, or 150:1) and may be about 7:1. This results in increased tension on the cord 493 with less rotational force on the upper cap 411. For example, in the shifted configuration, when the drive ratio is 7:1, the user can rotate the upper cap 411 seven rotations to achieve one rotation of the spool 550.

As the upper cap 411 continues to be rotated, tension on the cord 493 increases causing a torque increase. When the torque exceeds a desired threshold, the clutch 446 is actuated wherein the pin 418 is displaced from the pin recess 419 when the resilient member 419 is compressed between the pin 418 and the adjustable member 425. The upper cap 411 can be rotated one revolution without rotation of the drive axle 420 and the spool 550. Following one revolution, the pin 418 is again disposed in the pin recess 419. Upon return of the pin 418 to the pin recess 419 an audible and tactile feedback (e.g., a click) is transmitted to the user to indicate that a desired or maximum tension has been applied to the cord 493.

In some embodiments, the user may reverse rotation of the upper cap 411 to unwind the cord 493 or lessen the tension. In certain embodiments, the upper cap 411 can be rotated from about two rotations to about five rotations to release tension on and unwind the cord 493 from the spool 550. As tension in the cord 493 is reduced, the reel device 400 automatically transitions from the shifted configured back to the pre or non-shifted configuration. For example, in the shifted configuration, the torque control member 520 is in a compressed state thereby exerting a force on the shift member 530 that is towards the pre or non-shifted configuration. As tension in the cord 493 is reduced, the force applied by the torque control member 520 exceeds the torque force applied by the cord 493 causing the shift member 530 to transition from the shifted configuration and back to the pre or non-shifted configuration. During this transition, the slot pins 529 slide within the slots 512 from the upper position and back to the lower position causing the shift member 530 to be moved downwards. The downward movement of the shift member 530 causes the upwardly extending protrusions 536 to disengage with the recesses 454 of the lower cap 450 thereby allowing the lower cap to freely rotate with the upper cap 411. In such a manner, the reel device 400 can be shifted and unshifted automatically as the user operates the device 400.

It will further be appreciated that the reel device 400 can work in either direction. For instance, if you begin tightening the reel device 400 by rotating the upper cap 411 in the clockwise direction, a counterclockwise rotation of the upper cap 411 can unwind or loosen the cord 493. Similarly, if you begin tightening the reel device 400 by rotating the upper cap 411 in the counterclockwise direction, a clockwise rotation of the upper cap 411 can unwind or loosen the cord 493.

It will also be appreciated that any number of cords 493 can be used with the device 400. Thus, any reference to the use of a single cord 493 is merely exemplary and not limiting in any way. Rather, a plurality of cords 493 (e.g., 2, 3, 4 or more) can also be used with the device 400 as desired.

It will be appreciated that any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of adjusting an adjustable member may include one or more of the following steps: obtaining a reel device, comprising: a drive assembly and an automatic shift assembly; threading an elongate cord into the reel device; rotating the drive assembly at a first drive ratio of approximately 1:1; applying tension on the elongate cord to apply a torque force to the reel device that exceeds a threshold actuation torque force; and automatically actuating the shift assembly to transition the drive assembly to a second drive ratio of from about 2:1 to about 150:1. Other steps are also contemplated.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

The terms "a" and "an" can be described as one, but not limited to one. For example, although the disclosure may recite a housing having "a stopper," the disclosure also contemplates that the housing can have two or more stoppers.

Unless otherwise stated, all ranges include both endpoints and all numbers between the endpoints.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A reel device for tightening a cord, comprising:
   a drive assembly, wherein the drive assembly comprises:
   an upper member, wherein the upper member is rotatable in a first direction by a user;
   a drive axle coupled to the upper member;
   a pin gear;
   a cycloidal gear coupled to the pin gear;
   an outer gear coupled to the cycloidal gear; and a spool coupled to the outer gear, wherein rotation of the upper member in the first direction results in rotation of the outer gear and the spool in the first direction;

wherein the cycloidal gear is rotationally coupled to an eccentric shaft portion of the drive axle, and wherein the drive axle is configured to drive the cycloidal gear.

2. The reel device of claim 1, wherein the reel device is configured to rotate the spool at a first drive ratio or at a second drive ratio that differs from the first drive ratio, the second drive ratio ratio ranging from 2:1 to 150:1.

3. The reel device of claim 2, wherein the reel device is modular such that one or more components of the reel device is replaceable to achieve a third drive ratio different from the second drive ratio.

4. The reel device of claim 1, wherein the drive assembly further comprises a shift assembly that automatically transitions from a non-shifted configuration to a shifted configuration when a threshold torque force applied to the shift assembly is exceeded, wherein the shift assembly comprises:

a base removably coupled to the upper member; and
a shift member coupled to the base and configured to engage with a lower member that is coupled to the upper member.

5. The reel device of claim 4, wherein the lower member is non-rotatable relative to the upper member when the reel device is in the shifted configuration.

6. The reel device of claim 4, wherein the shift assembly further comprises a torque control member configured to restrain the shift member from transitioning from the non-shifted configuration to the shifted configuration until the threshold torque force is exceeded.

7. The reel device of claim 4, wherein the shift assembly automatically de-shifts when a torque force applied to the shift assembly is less than the threshold torque force.

8. The reel device of claim 1, wherein the outer gear comprises:

a plurality of inner recesses disposed between a plurality of inner lobes,
wherein the plurality of inner recesses receive a plurality of lobes of the cycloidal gear, and
wherein the outer gear is rotatable by the cycloidal gear around the longitudinal axis of the drive axle, and
wherein a number of recesses of the outer gear is greater than a number of lobes of the cycloidal gear by at least one.

9. The reel device of claim 1, wherein a ratio of a height of the reel device to the cycloidal gear ranges from 5:1 to 20:1.

10. The reel device of claim 1, wherein the reel device is coupled to an adjustable member.

11. The reel device of claim 10, wherein the adjustable member is any one of a prosthetic device, an orthotic device, a shoe, a boot, and an apparel member.

12. The reel device of claim 1, wherein the drive assembly is rotatable in a first direction to tighten the cord and is prevented from rotating in a second direction absent reverse rotation by a user.

13. The reel device of claim 1, wherein the upper member can be rotated in a clockwise or counterclockwise direction to uptake the cord.

14. A method of adjusting an adjustable member, comprising:

actuating a reel device, comprising:
a drive assembly;
an automatic shift assembly; and
an elongate cord;
rotating the drive assembly at a first drive ratio;
applying tension on the elongate cord to apply a torque force to the reel device that exceeds a threshold actuation torque force; and
automatically actuating the shift assembly to transition the drive assembly to a second drive ratio of from about 2:1 to about 150:1.

15. The method of claim 14, further comprising:
releasing the tension on the elongate cord;
de-shifting the shift assembly; and
automatically transitioning the first drive assembly from the second drive ratio to the first drive ratio.

16. A reel device for tightening a tensioning member, comprising:

a drive assembly comprising an upper member, a drive axle, and a gear assembly; and
a spool,
wherein the gear assembly comprises a cycloidal gear and an outer gear, wherein the outer gear is coupled to the spool such that rotation of the upper member and drive axle of the drive assembly in a first direction causes the outer gear and the spool to rotate in the first direction.

17. The reel device of claim 16, comprising a first mode having a first drive ratio and a second mode having a second drive ratio ranging from 2:1 to 150:1, the first drive ratio being different than the second drive ratio.

18. The reel device of claim 16, wherein the reel device is coupled to an adjustable member, wherein the adjustable member is any one of a prosthetic device, an orthotic device, a shoe, a boot, and an apparel member.

19. The reel device of claim 16, further comprising a base assembly, wherein the base assembly comprises a shift assembly.

20. The reel device of claim 16, wherein the upper cap can be rotated in a clockwise or counterclockwise direction to uptake the tensioning member.

* * * * *